US009303669B2

(12) United States Patent
Agri et al.

(10) Patent No.: US 9,303,669 B2
(45) Date of Patent: Apr. 5, 2016

(54) WALL FASTENER AND METHODS FOR ITS USE

(71) Applicants: Jonathan Seth Agri, Johns Creek, GA (US); Michael Francis Kress, Alparetta, GA (US)

(72) Inventors: Jonathan Seth Agri, Johns Creek, GA (US); Michael Francis Kress, Alparetta, GA (US)

(*) Notice: Subject to any disclaimer, the term of this patent is extended or adjusted under 35 U.S.C. 154(b) by 0 days.

(21) Appl. No.: 13/999,630

(22) Filed: Mar. 13, 2014

(65) Prior Publication Data

US 2014/0271031 A1  Sep. 18, 2014

Related U.S. Application Data

(60) Provisional application No. 61/852,269, filed on Mar. 14, 2013.

(51) Int. Cl.
*F16B 21/00* (2006.01)
*F16B 13/08* (2006.01)

(52) U.S. Cl.
CPC ....... *F16B 13/0808* (2013.01); *Y10T 29/49947* (2015.01)

(58) Field of Classification Search
CPC .................. F16B 13/0808; Y10T 29/49947
USPC .............................. 411/344, 345, 29–31, 550
See application file for complete search history.

(56) References Cited

U.S. PATENT DOCUMENTS

| 499,444 | A | * | 6/1893 | Schumann | F16B 13/0808 411/344 |
| 1,210,451 | A | * | 1/1917 | France | F16B 13/0808 411/345 |
| 2,377,086 | A | * | 5/1945 | Lang | B25B 31/005 29/238 |
| 2,404,169 | A | * | 7/1946 | Gidden | B25B 31/005 411/340 |
| 4,553,889 | A | * | 11/1985 | Le Dantec | F16B 13/04 405/259.1 |
| 4,717,101 | A | * | 1/1988 | Harrod | A47B 96/07 248/200.1 |
| 4,834,601 | A |   | 5/1989 | Schaap | |
| 5,028,186 | A |   | 7/1991 | McSherry | |
| 5,108,240 | A | * | 4/1992 | Liebig | F16B 35/047 411/21 |
| 5,417,531 | A | * | 5/1995 | Brown | E05F 5/06 29/525.01 |
| 5,509,765 | A |   | 4/1996 | Albin | |
| 5,749,687 | A | * | 5/1998 | Kilgore, III | F16B 13/0808 411/29 |
| 5,991,984 | A | * | 11/1999 | Schaty | F16B 13/0808 24/609 |
| 6,004,088 | A | * | 12/1999 | Hunt | F16B 13/0808 411/21 |
| 6,203,260 | B1 | * | 3/2001 | Henline | F16B 13/04 411/340 |
| 6,494,653 | B2 | * | 12/2002 | Remmers | F16B 13/126 411/340 |
| 7,850,408 | B2 |  | 12/2010 | Ernst et al. | |
| 8,449,236 | B2 |  | 5/2013 | McDuff et al. | |
| 8,479,368 | B2 |  | 7/2013 | Hanratty | |

* cited by examiner

Primary Examiner — Gary Estremsky
(74) Attorney, Agent, or Firm — Karl P. Dresdner, Jr.

(57) ABSTRACT

Overcoming all typical limitations of fasteners, disclosed is a fully-reusable, non-deforming, precise position, drywall fastener for heavy-weight items that works by anchoring to outside of a drywall panel using a drywall hole reinforced hollow cutter bar and a precise-fit pin wall body with outside rims, while fastener anchors beneath drywall panel by a manual pivoting of fastener locking arms hinged to pin wall body. Advancement of a threaded locking bolt through a center hole of pin wall body reversibly wedges apart shoulders of locking arms to cause their lateral pivoting and then locking without over-tightening fastener parts or damaging drywall.

20 Claims, 14 Drawing Sheets

SIDE VIEW

SIDE VIEW

SIDE VIEW

FIG.7
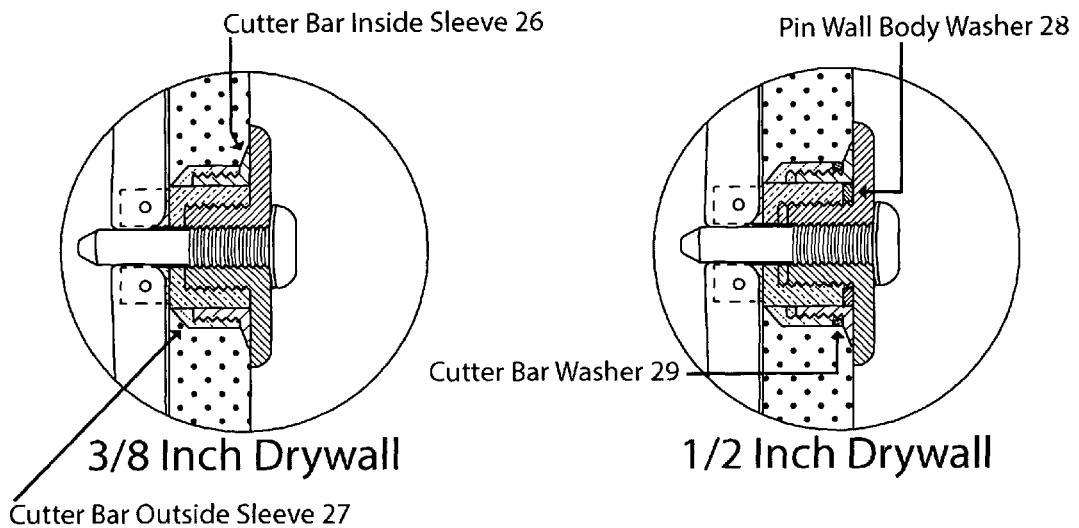
3/8 Inch Drywall    1/2 Inch Drywall
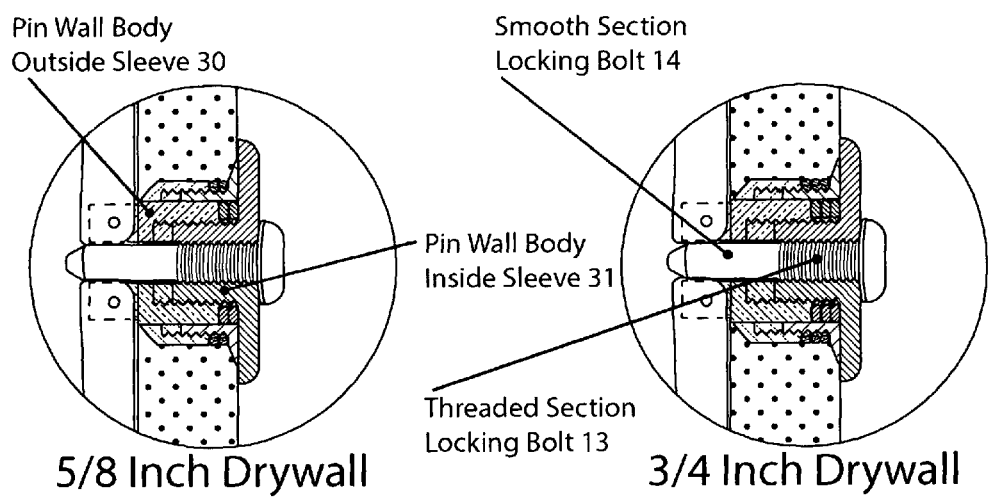
5/8 Inch Drywall    3/4 Inch Drywall

SIDE VIEW

FIG.13
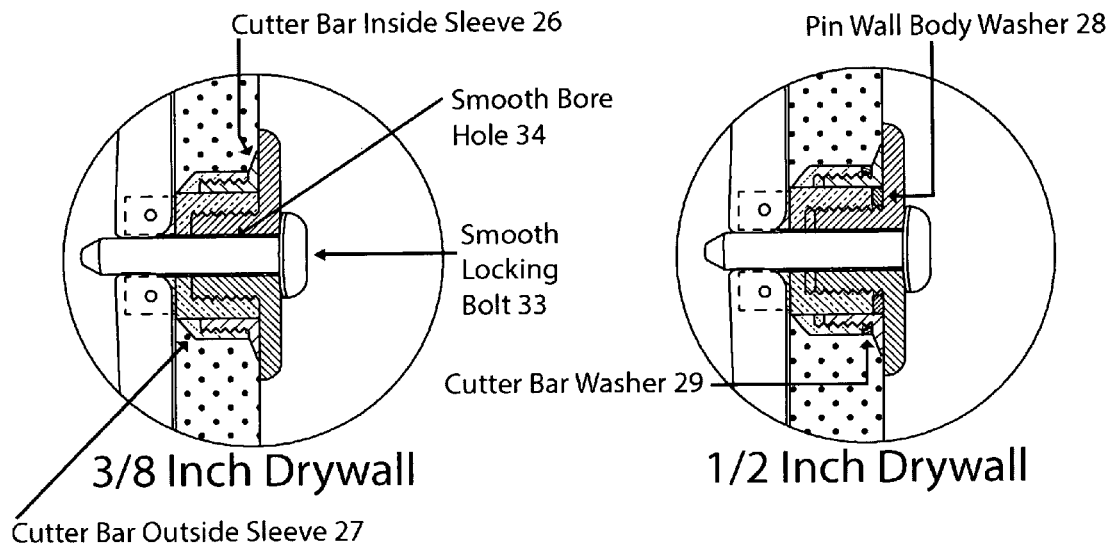
3/8 Inch Drywall — Cutter Bar Inside Sleeve 26, Smooth Bore Hole 34, Smooth Locking Bolt 33, Cutter Bar Outside Sleeve 27
1/2 Inch Drywall — Pin Wall Body Washer 28, Cutter Bar Washer 29
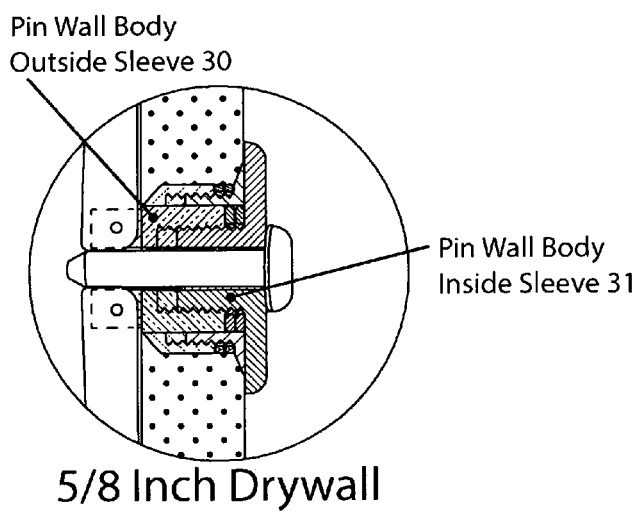
5/8 Inch Drywall — Pin Wall Body Outside Sleeve 30, Pin Wall Body Inside Sleeve 31
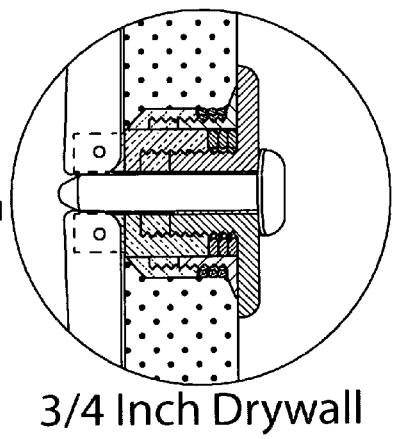
3/4 Inch Drywall

WALL FASTENER AND METHODS FOR ITS USE

REFERENCE TO RELATED APPLICATIONS

This application is a non-provisional application of and claims priority from provisional application U.S. Ser. No. 61/852,269, filed on Mar. 14, 2013, the entirety of which is hereby incorporated by reference herein.

FIELD OF THE INVENTION

The present invention is generally related to wall fasteners. More specifically, this invention relates to a wall fastener apparatus and methods of using the apparatus.

BACKGROUND OF THE INVENTION

Various fasteners are available for use on existing walls and ceilings to quickly attach certain household items such as cabinets, clocks, towel bars, hand railings, paintings, shelving, mirrors, light fixtures, and televisions. Known wall and ceiling fasteners include nails, screws, hooks, raptor anchors, molly bolts and toggle bolts. Most often the walls are made of drywall panels over a wood stud framing where the studs are about two inches wide and sixteen inches apart. This stud framing produces 3½ inches deep hollow spaces beneath almost 90 percent of a drywall panel. In drywall-based ceilings, there is joist framing which produces 7½ inch deep hollow spaces beneath almost 90 percent of a ceiling drywall panel. Known fasteners can be used to securely attach a moderate weight household item (less than 100 lbs.) but not to securely attach a heavy weight household item (more than 100 lbs.) to drywall over a hollow space. Heavy household items, in particular cabinets loaded with dinner ware, and shelving loaded with books, need to be attached using long heavy duty nails or screws anchored in the wood framing. If a heavy item needs attachment to drywall over a hollow space, then the drywall can be opened up to add wood framing for fastening the heavy item, but this is a costly.

Known drywall fasteners such as raptor anchors, molly bolts and toggle bolts have some installation problems. Molly bolts and raptor anchors need to be inserted into a tight drywall panel hole and have a screw that needs to be turned a number of times to deform the fastener behind the drywall panel into an anchor, but this will not take place when the fastener loosens in the drywall hole which often happens. A toggle bolt has a nut with two spring-loaded toggle wings hinged to the nut. A toggle bolt has a thin shaft but requires a large panel hole. The tip of the toggle bolt shaft is inserted into the hole, then the toggle nut, and lastly the wide spring-loaded toggle wings. The toggle wings spring open in the hollow space beneath drywall. During installation, the ends of the toggle bolt wings point at all times to the inside surface of the drywall and cannot be removed if an error has been made. The toggle wings will only hook anchor to the inside face of the drywall without moving if the toggle bolt has been tightened down on the drywall sufficiently. The large panel hole permits the thin shaft of the toggle bolt to move sideways during installation, so it is necessary to repeatedly check the position of the item attached to the toggle bolt while the toggle bolt is tightened down onto the drywall. Also, when attaching a heavy weight item to drywall using a toggle bolt, the toggle bolt shaft can hang down at an angle from the drywall hole and slash the outside edge of the drywall hole. If a toggle bolt is over-tightened in the drywall, the toggle bolt wings may cut right through the drywall paper and crumble the gypsum plaster near the drywall hole. The installation may cause so much damage to the drywall that the toggle bolt wings will not anchor in the drywall. Thus, it is necessary with toggle bolts to support the weight of the heavy item while tightening the toggle bolt and then subsequently monitor the position of the item on the drywall for downward movements. If a toggle bolt is over-tightened to prevent movement, the hinging between the toggle wings and the nut may bend apart. When a toggle bolt is removed from drywall hole only the toggle bolt shaft can be recovered without tearing up the hole. Accordingly, there is a need for a reliable, easy to install precise and stable, drywall fastener for attaching a heavy item to drywall over a hollow space.

SUMMARY OF THE INVENTION

Some embodiments of the invention are a fastener useful for attaching a household item such as for example, a cabinet, a clock, a towel bar, a hand railing, a painting, shelving, a counter, a table, a chalk board, a mirror, a light fixture, a television, a video camera, tools, a ceiling fan, or a bicycle to a wall, a ceiling, or a door location having a hollow space beneath the panel. In addition, some embodiments provide a fastener useful for attaching an item or an object to a variety of surfaces, including a beam, a rafter, a roof, a fascia, a floor, a porch, or a deck. Often a fastener of the present invention may be attached to an item before or after the fastener is attached to the panel. A wall, a ceiling, a door, or another surface having one of more hollow spaces beneath the surface material is defined to be a panel. It is common in residential wall and ceiling construction that the panel is a drywall panel. The panel may be another material-based panel such as for example, a finished wood panel, tile on cement board, plywood, or metal that has a hollow space with an inside surface for anchoring a locking arm of the fastener.

To use the fastener to attach an item to a drywall panel or another type of panel, first the panel needs to be cut to have a hole for inserting the fastener into the panel. The hole in the drywall may be cut using a hollow thin-walled tube called a cutter bar as a guide for the size and shape of the hole in the panel. Preferably the cutter bar has a beveled cutting edge which has a very sharp edge which furthermore may be serrated with teeth or another cutting edge design which facilitates the process of cutting a hole through a drywall panel. The cutter bar teeth may be indented into the drywall paper to leave teeth marks as a guide for drilling the hole in the drywall. Alternatively, when the panel material is harder than drywall, the cutter bar may be used as a stencil to draw a pattern for the hole to be cut on the panel. The hole in a hard panel can be cut using a drill, a sabre saw, a chisel, or some combination thereof or by another means known in the art.

One embodiment of the invention is a fastener for attaching an item to a panel over a hollow space once the panel has a hole for securing the fastener to the panel, the fastener comprising: a threaded locking bolt having a locking bolt head, a threaded locking bolt shaft and a locking bolt tip; a pin wall body with a pin wall body rim; and locking arms with shoulders hinged to the pin wall body, wherein the locking arms with the shoulders hinged to the pin wall body are capable of being inserted into a panel hole, wherein the pin wall body has a threaded hole for rotating the threaded locking bolt to move the locking bolt tip to push upon and lock apart the shoulders of the locking arms hinged to the pin wall body as a means for causing the locking arms to pivot into a locked position in the hollow space next to an inside surface of the panel as a means for anchoring the pin wall body to an inside surface of the panel, wherein the pin wall body rim is capable of anchoring the pin wall body to an outside surface of the panel, and wherein the locking bolt head of the threaded locking bolt in the threaded hole of the pin wall body rim is capable of being used as a means for attaching an item or a bracket to the pin wall body rim after the pin wall body has been anchored to the inside surface and outside surface of the panel over a hollow space in the panel.

Optionally, in some embodiments, a bracket system, is used for making an efficient and safer attachment of a moderate to heavy weight item to a wall panel (FIG. 6). Optionally a light item may be attached to a wall using the bracket system. For embodiments of the invention that employ a bracket system, optionally the locking bolt shaft can be passed through a hole 23 or 24 in a lower bracket 17, 18, or 19 before inserting the locking bolt in the pin wall body hole and before anchoring the pin wall body to the panel hole. After the pin wall body is anchored to the panel hole using the locking bolt, the locking bolt is rotated to tighten the locking bolt head against the lower bracket as needed. Optionally a pin wall body is used with a thin pin wall body rim so that the lower bracket rests closer to the wall panel. Optionally a separate bolt is used for attaching the lower bracket to the pin wall body rim so that the locking bolt is not involved in attaching, the lower bracket and the pin wall body is completely anchored to the wall panel prior to any work to attach the lower bracket to the pin wall body rim. Optionally, the lower bracket is made level as it is attached to the pin wall body rim which is anchored in the wall panel. The lower bracket can be made level having an upward-directed protruding edge (see Side View, FIG. 6). The lower bracket can have another connecting means. A moderate to heavy item, optionally a light item, is attached to rail hole 25 in an upper bracket 20, 21, or 22 which has a downward-directed protruding edge (see Side View, FIG. 6) or can have another connecting means. With the item attached to the upper bracket, the item is brought to be in the proximity of the lower bracket. In some embodiments, the downward-directed edge of the upper bracket 20, 21, or 22 is lowered down into the upward-directed edge of the lower bracket 17, 18, or 19 for connecting the brackets. Alternatively, the upper and lower brackets are coupled in another known manner. It is preferred that the upper bracket can be moved horizontally on the lower bracket as needed, optionally for centering the item on the upper bracket as desired. Optionally more than one fastener may be used to secure the lower bracket to a wall panel. This horizontal movement of the upper bracket on the lower bracket may be facilitated by using a friction-reducing system such as ball or pin needle bearings or other known bearing systems between the contacting surfaces of the brackets. The horizontal position of the item can be then fixed by, for example, tightening a setscrew between the brackets.

Another embodiment of the invention is a fastener for attaching an item to a panel over a hollow space once the panel has a hole for securing the fastener to the panel, the fastener comprising: a threaded locking bolt having a locking bolt head, a threaded locking bolt shaft and a locking bolt tip; a pin wall body with a pin wall body rim; and locking arms with shoulders hinged to the pin wall body, wherein the locking arms with the shoulders hinged to the pin wall body are capable of being inserted into a panel hole, wherein the pin wall body has a threaded hole for rotating the threaded locking bolt to move the locking bolt tip to push upon and lock apart the shoulders of the locking arms hinged to the pin wall body as a means for causing the locking arms to pivot into a locked position in the hollow space next to an inside surface of the panel as a means for anchoring the pin wall body to an inside surface of the panel, wherein the pin wall body rim is capable of anchoring the pin wall body to an outside surface of the panel, and wherein the pin wall body rim has one or more separate threaded holes as means for attaching one or more separate threaded anchor bolts to the rim for attaching an item to the fastener after the pin wall body has been anchored to the inside surface and outside surface of the panel over a hollow space in the panel. As an alternative option, in some embodiments, first a separate bolt is used to attach a lower bracket to a separate threaded hole in the pin wall rim. Then the item to be attached to the panel is attached to an upper bracket. Then with the item attached to the upper bracket, the upper bracket is connected to the lower bracket which is attached to the fastener which is attached to the panel.

When inserting the locking arms into the hole of the panel, the locking arms can be held close together, approximately parallel and in the same axis as the pin wall body. For some embodiments of the present invention, the hole in the panel will be cut to have dimensions that match the cross-sectional shape and dimensions of the pin wall body. This enables the pin wall body to be precisely inserted into the hole in the panel up to the rim of the pin wall body. For example when the pin wall body is round in cross-section then the hole in the panel would be round in cross-section.

In some embodiments the hollow cutter bar is left in a fully inserted position in the hole in the panel to add structural support to the hole in the panel. The cutter bar may have an outer rim. The cutter bar rim can be set down on the outside surface of the panel when the cutter bar is fully-inserted into the panel hole so the cutter bar does not fall into the panel hole. When the cutter bar is fully inserted in the panel hole, the pin wall body of the fastener may be inserted into the cutter bar hole so that the rim of the pin wall body rests against the cutter bar rim. Preferably the cutter bar and the pin wall body are round and made of a metal. Typically drywall panel comes ⅜, ½, ⅝, or ¾ inch in thickness. In most cases, a cutter bar will be selected that has a tube length that is less than or equal to the panel thickness. When the panel is installed to make a wall, ceiling or door, the effective panel thickness is the distance from the surface of the panel to the hollow space behind the installed panel. If the wall is tiled over cement board, then the cutter bar may have a tube length as long as the tile panel plus cement board thicknesses as installed. In some embodiments, the cutter bar is a two-piece cutter bar having concentric sleeves, each with a complementary threading so rotating one of the sleeve with respect to the other sleeve changes the total overall length of the two-piece cutter as a means for adjusting the cutter bar tube length to match the panel thickness. The cutter bar outer rim may be present on the smaller sleeve which may hold one or more hollow metal washers to abut with the outer sleeve edge for tightening the two-piece sleeves of the cutter bar to each other.

Another embodiment of the invention is a fastener for attaching an item to a panel over a hollow space once the panel has a hole for securing the fastener to the panel, the fastener comprising: a threaded locking bolt having a locking bolt head, a threaded locking bolt shaft and a locking bolt tip; a pin wall body with a pin wall body rim; and locking arms with shoulders hinged to the pin wall body, wherein the locking arms with the shoulders hinged to the pin wall body are capable of being inserted into a panel hole, wherein the pin wall body has a threaded hole for rotating the threaded locking bolt to move the locking bolt tip to push upon and lock apart the shoulders of the locking arms hinged to the pin wall body as a means for causing the locking arms to pivot into a locked position in the hollow space next to an inside surface of the panel as a means for anchoring the pin wall body to an inside surface of the panel, wherein the pin wall body rim is capable of anchoring the pin wall body to an outside surface of the panel, wherein the locking bolt head of the threaded locking bolt in the threaded hole of the pin wall body rim is capable of being used as a means for attaching an item to the pin wall body rim after the pin wall body has been anchored to the inside surface and outside surface of the panel over a hollow space in the panel; and the fastener further comprising a cutter bar capable of cutting the hole in the panel.

Another embodiment of the invention is a fastener for attaching an item to a panel over a hollow space once the panel has a hole for securing the fastener to the panel, the fastener comprising: a threaded locking bolt having a locking bolt head, a threaded locking bolt shaft and a locking bolt tip; a pin wall body with a pin wall body rim; and locking arms with shoulders hinged to the pin wall body, wherein the locking arms with the shoulders hinged to the pin wall body are capable of being inserted into a panel hole, wherein the pin wall body has a threaded hole for rotating the threaded locking bolt to move the locking bolt tip to push upon and lock apart the shoulders of the locking arms hinged to the pin wall body as a means for causing the locking arms to pivot into a locked position in the hollow space next to an inside surface of the panel as a means for anchoring the pin wall body to an inside surface of the panel, wherein the pin wall body rim is capable of anchoring the pin wall body to an outside surface of the panel, wherein the pin wall body rim has one or more separate threaded holes as means for attaching one or more separate threaded anchor bolts to the rim for attaching an item to the fastener after the pin wall body has been anchored to the inside surface and outside surface of the panel over a hollow space in the panel; and the fastener further comprising a cutter bar capable of cutting the hole in the panel.

As mentioned, when inserting the locking arms into the hole of the panel, the locking arms may be conveniently positioned parallel to the pin wall body hole. One method for securing a fastener to a panel over a hollow space, comprises: cutting the panel to have a hole; inserting locking arms hinged to a pin wall body into the hole of the panel; holding a rim of the pin wall body against an outside edge of the hole while advancing a locking bolt in a hole in the pin wall body for bringing a tip of the locking bolt to shoulders of the locking arms hinged to the pin wall body; pushing the shoulders of the locking arms with the tip of the locking bolt for pivoting ends of the locking arms laterally in the hollow space to a position against to an inside surface of the panel; and maintaining the locking arms in the position against the inside surface of the panel by keeping the locking bolt between the shoulders of the locking arms.

The method for securing a fastener to a panel over a hollow space may use a rotatable locking bolt, wherein a percentage of the locking bolt shaft adjacent to the locking bolt head is threaded for rotating in a threaded hole in the pin wall body as a means for advancing the tip of the locking bolt to shoulders of the locking arms, hinged to the pin wall body, for pushing the shoulders of the locking arms with the tip of the locking bolt, for pivoting ends of the locking arms laterally in the hollow space, so that the ends of the locking arms position against to an inside surface of the panel, and for locking the locking arms in the position against the inside surface of the panel by keeping the locking bolt between the shoulders of the locking arms. The portion of the locking bolt that is not threaded has a smaller diameter than the outer threaded diameter of the locking bolt. In one embodiment the back half of the locking bolt shaft is threaded and the front half of the locking bolt shaft is not threaded.

BRIEF DESCRIPTION OF THE SEVERAL VIEWS OF THE DRAWINGS

The foregoing summary, as well as the following detailed description of preferred embodiments of the invention, will be better understood when read in conjunction with the appended figures ("FIGS."). For the purpose of illustrating the invention, there is shown in the figures, embodiments that are presently preferred. It should be understood, however, that the invention is not limited to the precise arrangements and instrumentalities shown in the figures.

FIG. 7 depicts four cross-sectional expanded views of drywall of a ⅜, a ½, a ⅝, and a ¾ inch thickness drywall wherein each drywall has hole in which the length of a two-piece cutter bar and the length of a two-piece pin wall body have been adjusted for the thickness of the drywall panel, in accordance with one embodiment of the present invention.

FIG. 13 depicts four cross-sectional expanded views of drywall of a ⅜, a ½, a ⅝, and a ¾ inch thickness drywall wherein each drywall has a hole in which the length of a two-piece cutter bar and the length of a two-piece pin wall body have been adjusted for the thickness of the drywall panel, in accordance with one embodiment of the present invention. The depicted fastener has a smooth locking bolt and a pin wall body having a smooth bore hole, in accordance with one embodiment of the present invention.

DETAILED DESCRIPTION OF THE INVENTION

Figure 1:
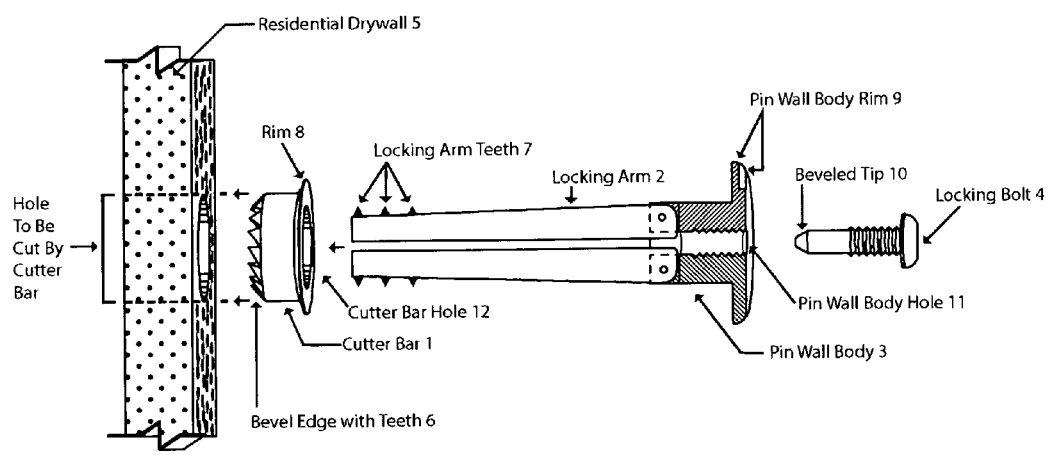
FIG. 1 depicts a side view of a fastener having adjacent locking arms connected to a pin wall body ready to be inserted through a cutter bar that can fit into a hole in drywall, in accordance with one embodiment of the present invention.

Some embodiments of the invention are a fastener useful for attaching a household item such as for example, a cabinet, a clock, a towel bar, a hand railing, a painting, shelving, a counter, a table, a chalk board, a mirror, a light fixture, a television, a video camera, tools, a ceiling fan, or a bicycle to a wall, a ceiling, or a door location having a hollow space beneath the panel. In addition, some embodiments provide a fastener useful for attaching an item or an object to a variety of surfaces, including a beam, a rafter, a roof, a fascia, a floor, a porch, or a deck. Often a fastener of the present invention may be attached to an item before or after the fastener is attached to the panel. A wall, a ceiling, a door, or another surface having one of more hollow spaces beneath the surface material is defined to be a panel. A panel also may be defined as a shape of a material that has a width and a length longer that are greater than the thickness of the material. It is common in residential wall and ceiling construction that the panel is a drywall panel. The panel may be another material-based panel such as for example, a finished wood panel, tile on cement board, plywood, or metal that has a hollow space with an inside surface for anchoring a locking arm of the fastener.

It is one object of the invention to provide a fastener capable of being used to quickly efficiently attach an item to a panel with a hollow space behind the panel. It is also an object of the invention to provide a fastener that has a low risk of being over-tightened against a panel in a manner which may damage the panel or the fastener and lead to fastener failure. It is also an object of the invention to provide a fastener capable of quickly being removed from a surface material panel. It is an additional object of the invention to provide a fastener that can be removed intact, reusable, and not deformed. It is an additional object of the invention to provide a set of upper and lower bracket system which can be used in combination with a fastener of the present invention for quickly attaching objects in a level manner to a wall panel having at least one hollow space behind the panel Typical wall and ceiling panels are attached using nails, screws or glue to a framing system in a building such as for example, a residence building of a household. Such attached panels may be described as having an exterior surface or an outside surface. Underneath the attached panel there are often hollow spaces between the structural framing members.

Examples of a panel include a wall, a ceiling, and a hollow door. Examples of a panel usually having a hollow space behind the panel to which a fastener of the present invention may be anchored include a panel selected from the group consisting of a drywall, a tile on a green board, a tile on a cement board, a plaster on mesh over a stud framing, a plaster on lathe over a stud framing, a plaster on mesh over a joist framing, a plaster on lathe over a joist framing, a plaster molding, a plaster ornamentation, a plastic molding, a plastic ornamentation, a wood paneling, wood molding, a plywood, a hardwood panel, a softwood panel, a wood plank, a wood board, a plastic paneling, a Trek plank, a polymer paneling, a polymer molding, a metal panel, a metal molding, a metal grill, a ceramic tile, a side of a hollow cinder block, a glass plate, a glass block, a brick, a stone slab, a slate, and a combination thereof.

The fastener may be constructed for example, of a metal, a plastic, a wood, a fiberglass, a ceramic, or a mixture thereof. A fastener of the present invention may be attached to an item before or after the fastener is attached to the panel.

The hole in the panel for insertion of a fastener of the invention may be created using a drill, a sabre saw, a chisel, a cutter bar, or some combination thereof or by another means known in the art. Depicted in FIG. 1, is a round cutter bar 1 with a cutter bar hole 12 and a backside cutter bar rim 8 and a front end beveled edge with a plurality of teeth 6. Also depicted in FIG. 1, to left of cutter bar is a segment of a residential drywall panel 5 having a hole of a diameter similar to the exterior diameter of the cutter bar body 1. In addition, note that to the left of the residential dry wall 5 depicted in FIG. 1, would be the hollow space behind the drywall panel. For some embodiments of the present invention, as is depicted in FIG. 1, the hole in the panel 5 is cut to be of a shape with dimensions that match the cross-sectional shape and width dimensions of the pin wall body 3. This enables the pin wall body to be precisely inserted into the hole in the panel. In terms of its cross-sectional shape in the panel hole, the pin wall body is preferably round. As depicted in FIG. 1, when inserting the locking arms into the hole of the panel, the locking arms 2 may be held together in the same axis as the pin wall body 3. The pin wall body might be square, rectangular, elliptical, polygonal, or another shape in terms of its cross-sectional shape in the panel hole.

When using the fastener to attach an item to a drywall panel, the hole in the panel may be cut using a hollow cutter bar as a guide for the size and shape of the hole. Preferably the cutter bar is round as depicted in FIG. 1. The cutter bar may have a thin edged wall which may have a sharp edge which may be serrated or another cutting edge which facilitates the process of cutting a hole through the surface material as depicted in FIG. 1. The cutter bar may be used as a stencil to define the size and shape of the hole needed in the drywall panel or in another surface material panel. The thin edge of the cutter bar may be tapped against a drywall surface to start or create the hole in the panel. The hole in the surface of another panel material may also be cut to some extent using a drill, a sabre saw, a chisel, or some combination thereof or by another means known in the art.

Figure 8:
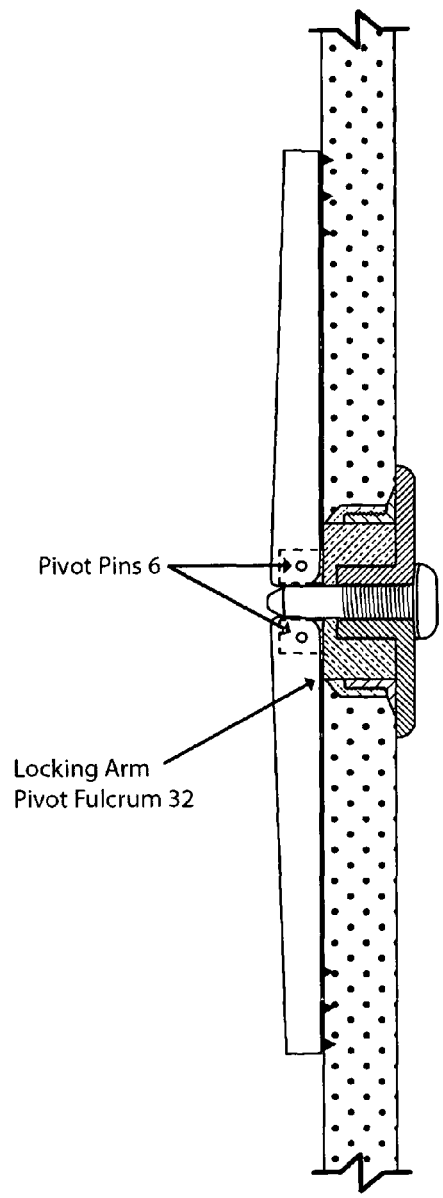
FIG. 8 depicts a cross-sectional view of a fastener from FIG. 7 in which the radius of the pin wall body outside sleeve and the radius of the cutter bar outside sleeve has been increased to move the locking arm pivot fulcrum a greater distance from the pivot pin of each locking arm than is depicted in FIG. 3, in accordance with one embodiment of the present invention.
Figure 9:
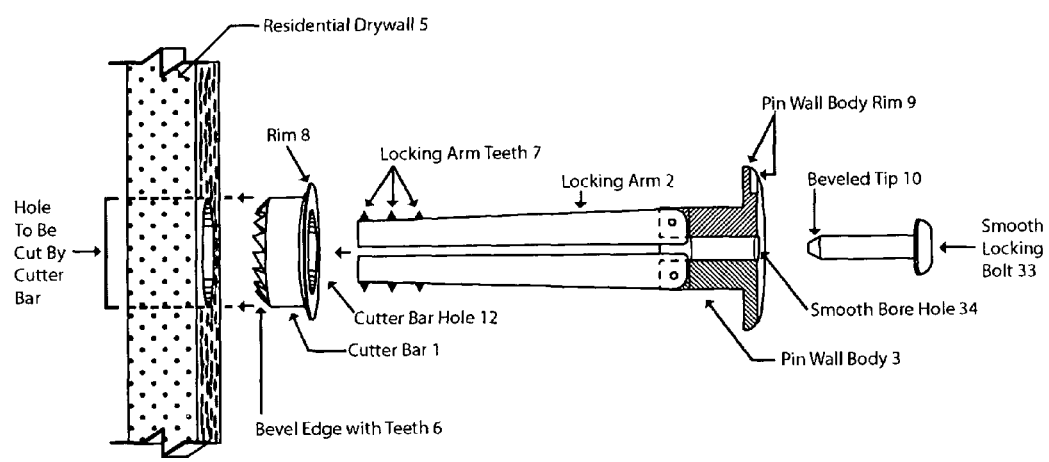
FIG. 9 depicts a side view of a fastener having adjacent locking arms connected to a pin wall body ready to be inserted through a cutter bar that can fit into a hole in drywall, in accordance with one embodiment of the present invention. The depicted fastener has a smooth locking bolt and a pin wall body having a smooth bore hole, in accordance with one embodiment of the present invention.
Figure 10:
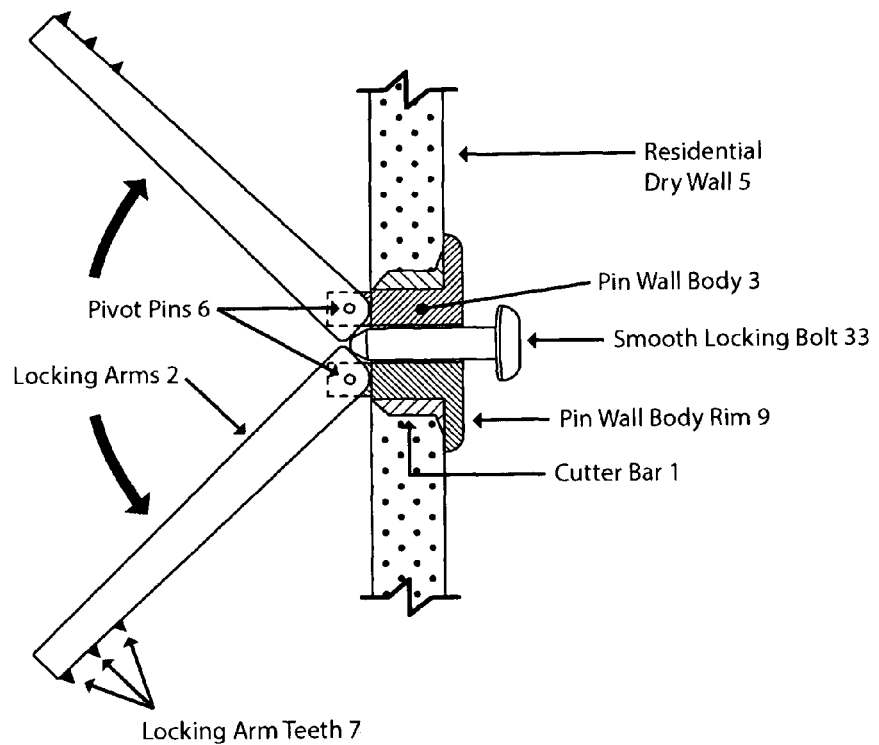
FIG. 10 depicts a cross-sectional view of a fastener with partially spread locking arms pivoted from the pin wall body which is seated inside a cutter bar which is seated in a drywall hole, in accordance with one embodiment of the present invention. The depicted fastener has a smooth locking bolt and a pin wall body having a smooth bore hole, in accordance with one embodiment of the present invention.
Figure 11:
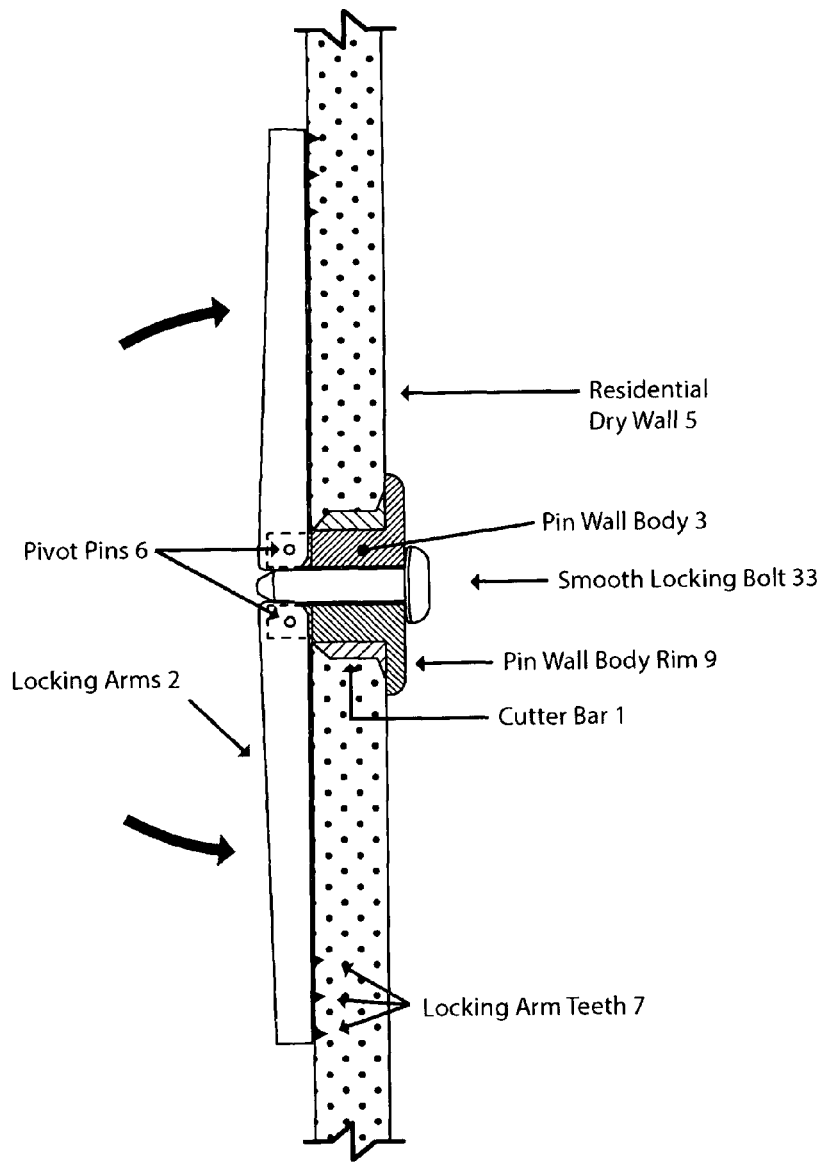
FIG. 11 depicts a cross-sectional view of a fastener anchored behind the drywall panel by fully-spread locking arms pivoted from the pin wall body which is seated inside a cutter bar which is seated in a drywall hole, in accordance with one embodiment of the present invention. The depicted fastener has a smooth locking bolt and a pin wall body having a smooth bore hole, in accordance with one embodiment of the present invention.
Figure 12:
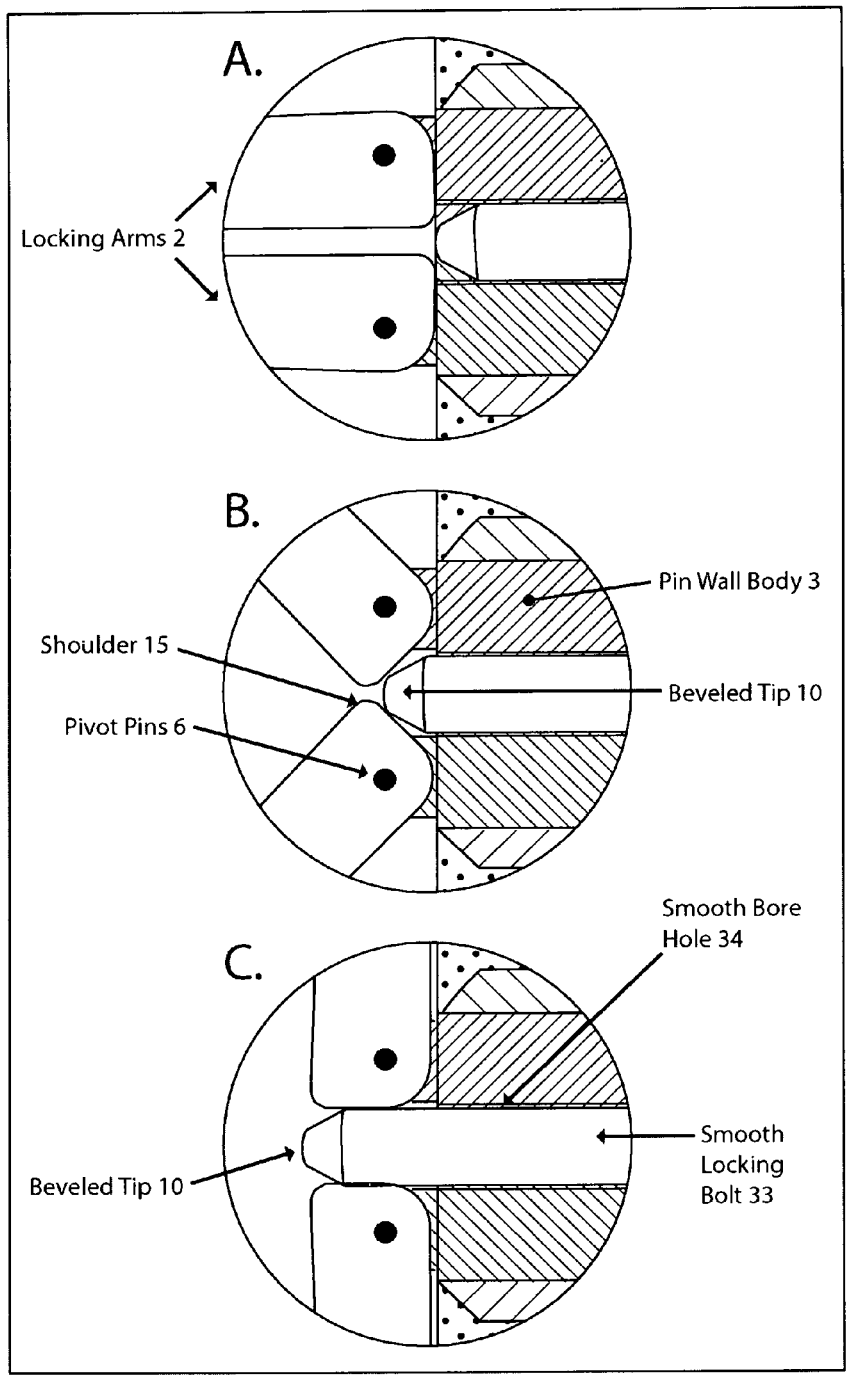
FIG. 12 depicts three cross-sectional expanded views of a fastener pivoting mechanism in three stages of action labeled A (from FIG. 1), B (from FIG. 2), and C (from FIG. 3) wherein the pivoting and locking of the locking arms is caused by the advancing tip of smooth locking bolt Dressing on shoulders of the locking arms, in accordance with one embodiment of the present invention. The depicted fastener has a smooth locking bolt and a pin wall body having a smooth bore hole, in accordance with one embodiment of the present invention.
Figure 14:
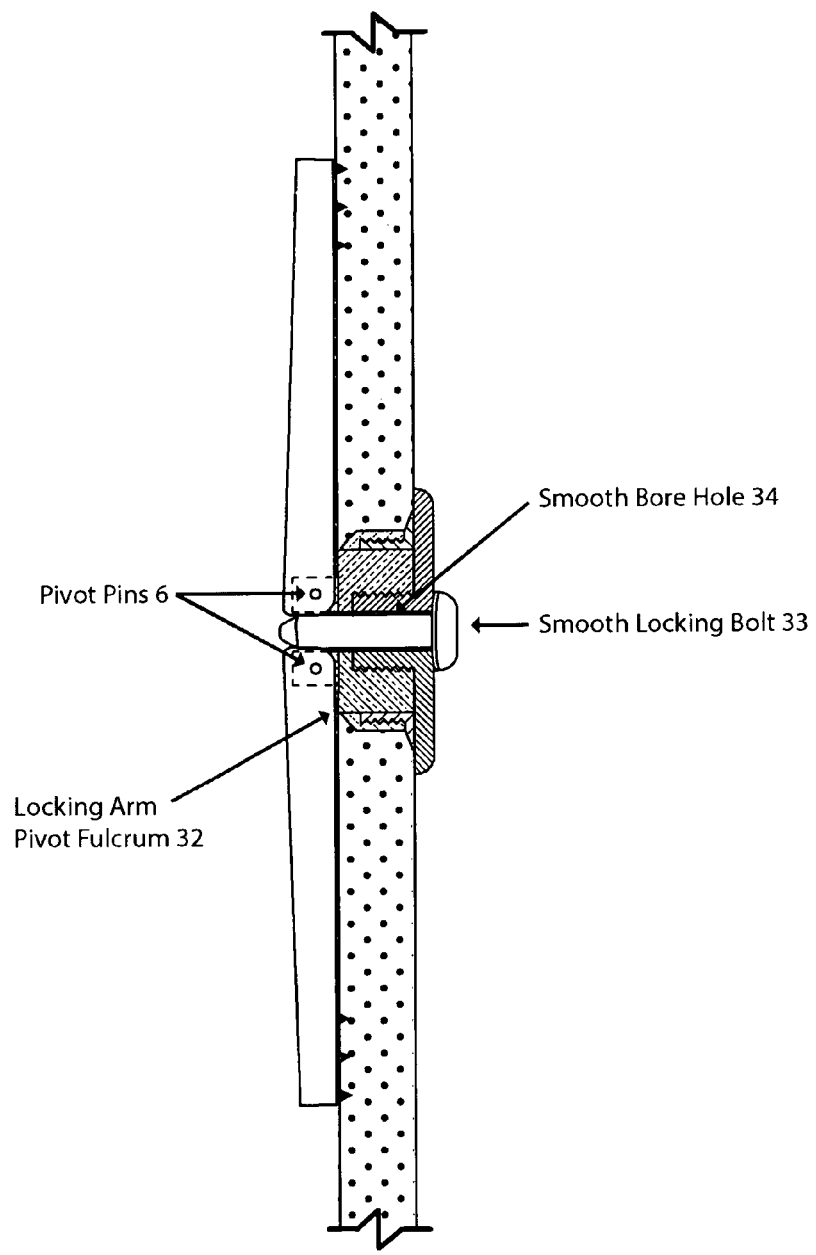
FIG. 14 depicts a cross-sectional view of a fastener from FIG. 13 in which the radius of the pin wall body outside sleeve and the radius of the cutter bar outside sleeve has been increased to move the locking arm pivot fulcrum a greater distance from the pivot pin of each locking arm than is depicted in FIG. 11, in accordance with one embodiment of the present invention. The depicted fastener has a smooth locking bolt and a pin wall body having a smooth bore hole, in accordance with one embodiment of the present invention.

In some embodiments of the invention a cutter bar is used to cut the hole in the panel as depicted in FIGS. 1 and 9. In some embodiments of the invention the cutter bar is left in the hole as is depicted in FIGS. 2, 3, 4, 7, 8, 10, 11, 12, 13, and 14. This is particularly useful for a protecting the integrity of a drywall panel hole where the cutter bar can function as a structural bushing element between the panel hole and the pin wall body and can facilitate a precise positioning and snug anchoring of the pin wall body in the panel as depicted in for example FIG. 3.

As depicted in FIG. 1, when inserting the locking arms into the hole of the panel, the locking arms 2 may be conveniently positioned parallel to the pin wall body hole 11. As may be appreciated by examining details depicted in FIGS. 1, 2, 3, and 4, a method for securing a fastener to a panel over a hollow space, comprises: cutting the panel to have a hole; inserting locking arms 2 hinged using pivot pins 6 of a pin wall body 3 into the hole of the panel; holding a rim 9 of the pin wall body against an outside edge of the hole while advancing a locking bolt 4 in a hole 11 in the pin wall body for bringing a tip 10 of the locking bolt to shoulders 15 of the locking arms 2 hinged to the pin wall body; pushing the shoulders 15 of the locking arms with the tip of the locking bolt for pivoting ends of the locking arms laterally in the hollow space to a position against to an inside surface of the panel 5; and maintaining the locking arms in the position against the inside surface of the panel by keeping the locking bolt section 14 between the shoulders 15 of the locking arms 2.

Figure 3:
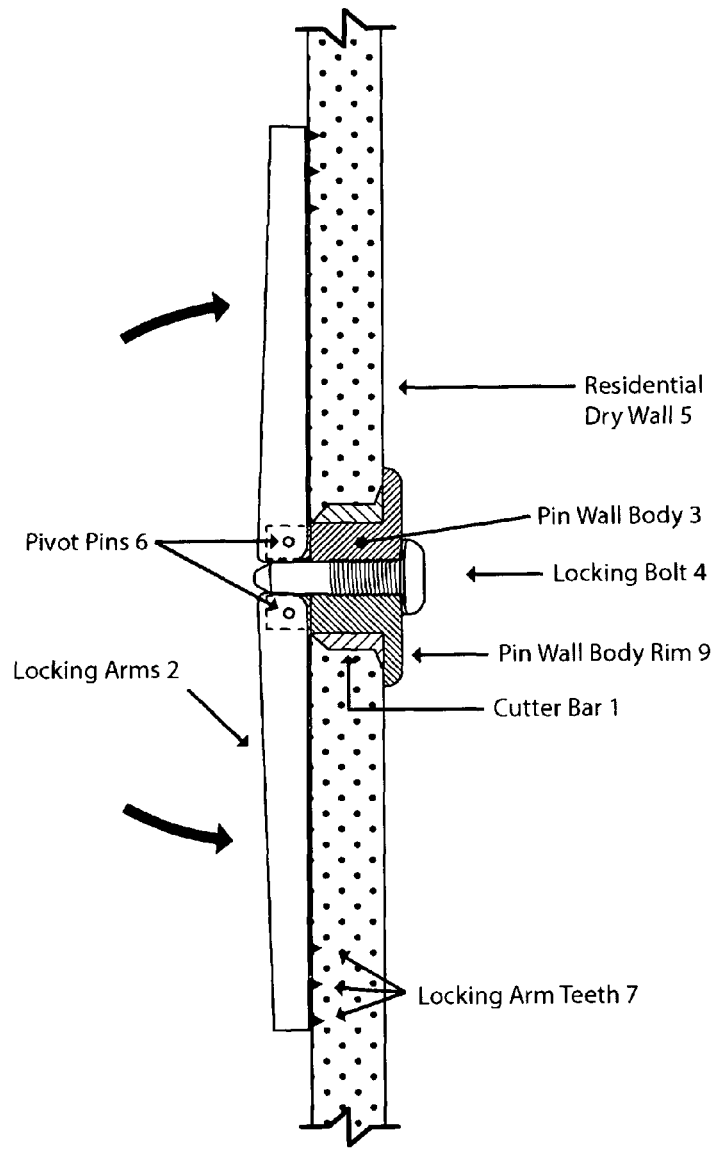
FIG. 3 depicts a cross-sectional view of a fastener anchored behind the drywall panel by fully-spread locking arms pivoted from the pin wall body which is seated inside a cutter bar which is seated in a drywall hole, in accordance with one embodiment of the present invention.

Locking arm ends may have a plurality of locking arm teeth 7 or spikes for example, as depicted in FIG. 1, and as depicted in FIG. 3 and FIG. 7, the locking arm teeth may become embedded into the inside surface of residential drywall 5 for stabilizing the position of the locking arm ends with the inside surface of a drywall panel.

Figure 2:
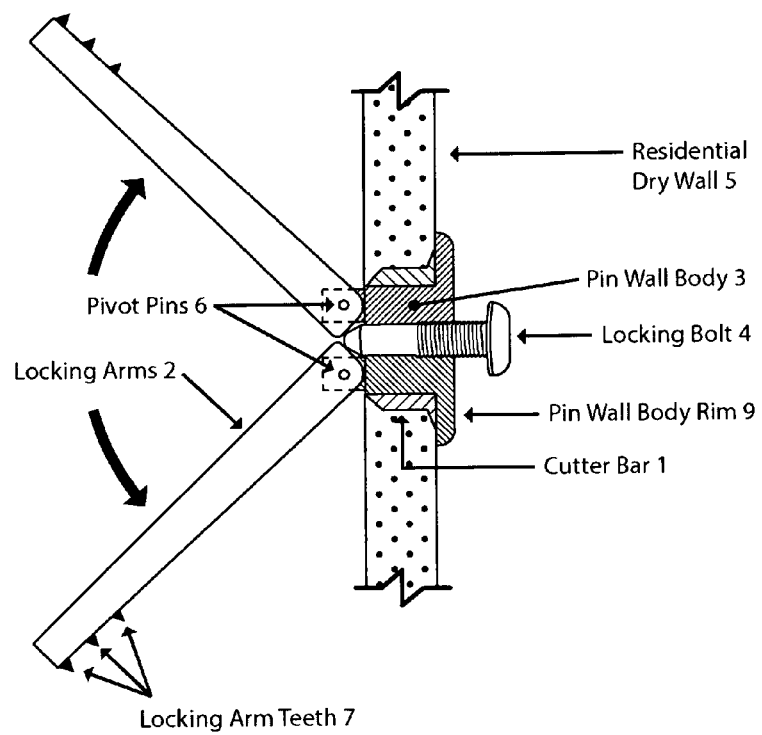
FIG. 2 depicts a cross-sectional view of a fastener with partially spread locking arms pivoted from the pin wall body which is seated inside a cutter bar which is seated in a drywall hole, in accordance with one embodiment of the present invention.
Figure 4:
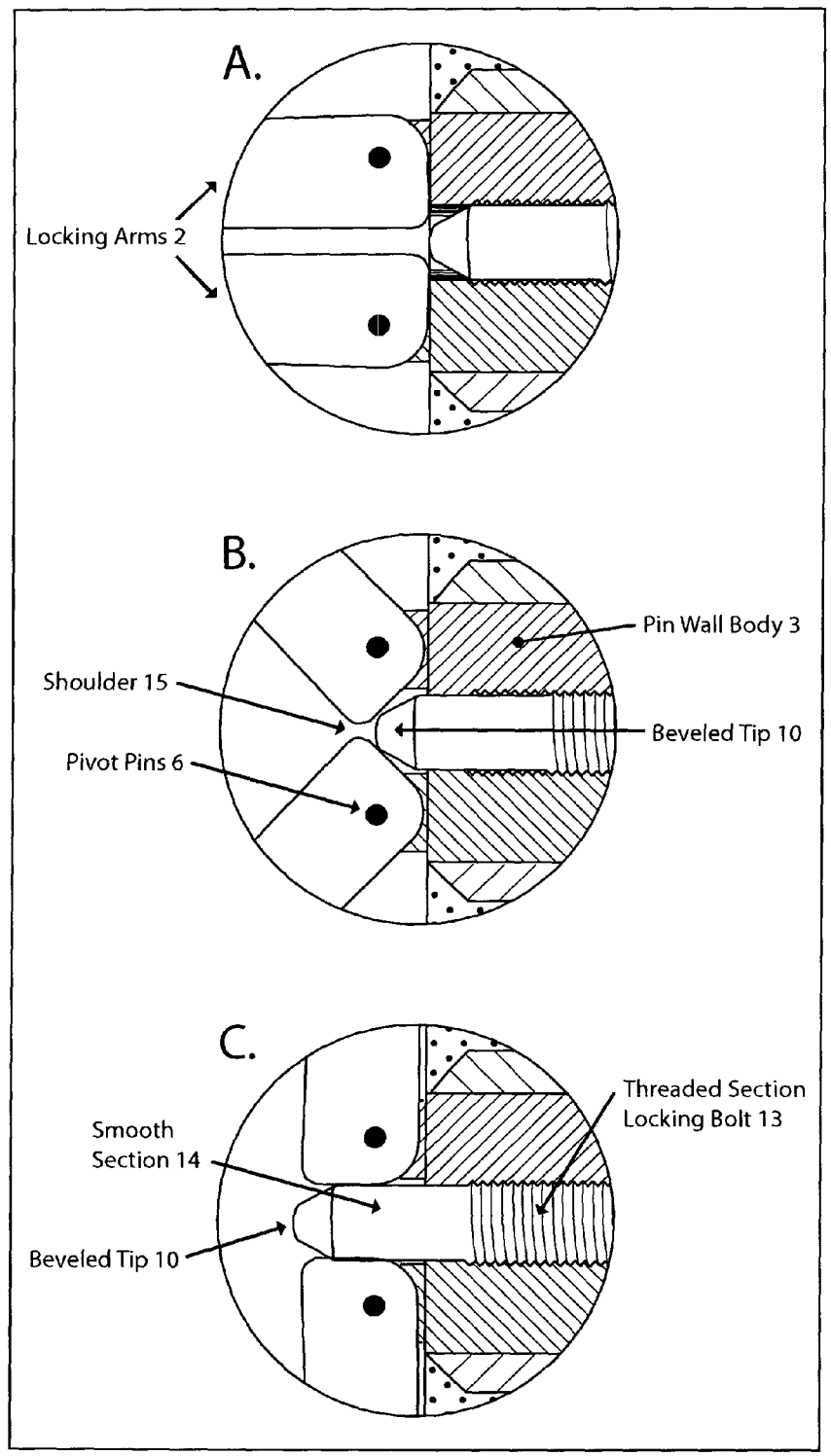
FIG. 4 depicts three cross-sectional expanded views of a fastener pivoting mechanism in three stages of action labeled A (from FIG. 1), B (from FIG. 2), and C (from FIG. 3) wherein the pivoting and locking of the locking arms is caused by the advancing tip of a locking bolt pressing on shoulders of the locking arms, in accordance with one embodiment of the present invention.

As depicted in FIGS. 1, 2, 3, and 4, the method for securing a fastener to a panel over a hollow space may use a rotatable locking bolt 4, wherein a percentage of the locking bolt shaft adjacent to the locking bolt head is a threaded section 13 for rotating in a threaded hole 11 in the pin wall body 3 as a means for advancing the tip 10 of the locking bolt to shoulders 15 of the locking arms 2, hinged to the pin wall body, for pushing the shoulders 15 of the locking arms with the tip 10 of the locking bolt, for pivoting ends of the locking arms laterally in the hollow space, as depicted in FIGS. 2,3, and 4, so that the ends of the locking arms position against to an inside surface of the panel 5 as depicted in FIG. 3 and FIG. 8, and for locking the locking arms in the position against the inside surface of the panel by keeping the locking bolt between the shoulders of the locking arms, as depicted in FIGS. 3, 4, 7, and 8. Note as depicted in FIGS. 4A, 4B, and 4C, a smooth section 14 of the locking bolt is not threaded and has a smaller diameter than the outer threaded diameter of the locking bolt. Also as depicted in FIGS. 1, 2, and 4, the diameter of the smooth section 14 of the locking bolt 4 is smaller than the minimum diameter of pin wall body hole 11. Furthermore, as depicted in FIGS. 1, 2, 3, 7, and 8, for example, in some embodiments of the invention, the back half of a locking bolt may have a threaded section 13 while the front half of the locking bolt shaft has a smooth section 14 which is smaller in diameter than the pin wall body hole 11 and the threaded section 13 of the locking bolt 4.

In one or more locations of the cutter bar or pin wall body there may be one or more set screws or other means for securing position of the pin wall body within the cutter bar tube. A screw or set of screws may be used to fix the position of the pin wall body at a selected rotation from horizontal with respect to the position of the cutter bar in the hole of the panel with consideration taken for the orientation of the structural framing members beneath the panel or for an optimal positioning of the locking arms against the inside of the panel. For example, depicted in FIG. 5, a 45 degree rotation of locking arms 2 has been selected from a horizontal plane using vertical notch 16 on pin wall body rim 9 as a reference point; and a locking bolt head 4 is depicted in a central position of the pin wall body rim 9.

The length of a hollow tube cutter bar may equal the thickness of the panel; may be adjustable by any means; or may be shorter than the panel thickness. In some embodiments as depicted in FIG. 7 and in FIG. 13 for example, the cutter bar is a hollow tube two-piece cutter bar, comprising: a cutter bar outside sleeve 27 having a threaded inside wall; and a cutter bar inside sleeve 26 having an outside thread, wherein the cutter bar outside sleeve tube can be threaded onto the cutter bar inside sleeve to vary the overall length of the two-piece cutter bar. The two-piece cutter bar can be adjusted in length for making the length of the cutter bar to be the same length as the thickness of the drywall panel as depicted in FIG. 7 and in FIG. 13 for drywall panels that are ⅜, ½, ⅝, and ¾ inch in thickness. As described above with varying thickness drywall panels, the length of a two-piece hollow tube cutter bar tube length may adjusted in relation to varying thickness of other materials used in kinds of panels.

A space is created between the rim 8 of the cutter bar inside sleeve 26 and the edge of the cutter bar outer sleeve 27 that increases as a two-piece outer is unscrewed to become longer to match, for example, the thickness of a drywall panel as depicted in FIG. 7. One or more cutter bar washers 29 may be inserted onto the outside of cutter bar sleeve 26 to occupy the space arising between the rim 8 of the cutter bar inside sleeve 26 and the edge of the cutter bar outside sleeve 27. Filling this space with one or more washers maintains the width of the space and allows a proper tightening of the cutter bar two sleeves together; and preferably this tightening is done before the cutter bar is positioned a panel hole to add structural support to the hole.

Preferably the outside sleeve of the cutter bar has a rim 8 to keep the cutter bar positioned in the panel hole to rest on the outside edge of the hole in the panel. As depicted in FIG. 1, the rim is wider in some aspects than the dimensions of the surface material hole. One use of the rim or sleeve on the cutter bar is for preventing the cutter bar from falling into the hole of the surface material. In drywall panels as depicted in FIGS. 1, 2, 3, and 7, for example, a cutter bar rim 8 may be beveled advantageously for pressing down to stabilize the cut paper edge of a cut hole in a drywall panel while the wall of the cutter bar lessens the risk of erosion of the gypsum plaster from the interior of a cut hole in the drywall.

The cutter bar 1 is a hollow tube 12 which may be a hollow-round tube as depicted in FIG. 1, or a hollow square tube, a hollow-rectangular tube, or a hollow-polygonal tube or another shape. In general the cross-sectional shape and size dimensions of the hollow in the cutter bar need to be at least slightly larger than the cross-sectional size and shape dimensions of the pin wall body as depicted for example in FIG. 2 and FIG. 3. When the cutter bar is in the hole in the panel, the locking arms 2 hinged to the pin wall body 3 and the pin wall body both are inserted into cutter bar. When inserting the locking arms into the hole 12 of the cutter bar, some or all of the locking arms may be held together in the same axis as the pin wall body as depicted for example in FIG. 1. The fit of the pin wall body in the cutter bar tube needs to be loose enough that these parts do not get stuck together. Preferably the fit of the pin wall body in the cutter bar tube allows for an easy sliding movement of the pin wall body in or out of the cutter bar with marginal friction.

A Pin wall body can be made with a length to match standard thicknesses of panel, materials such as drywall that typically has a ⅜, ½, ⅝, or ¾ inch thickness. For example in some embodiments the pin wall body is an adjustable-length two-piece pin wall body with one or more centralized threaded or smooth bore holes for insertion of a threaded, partially-threaded or smooth locking bolt as depicted in FIG. 7 with a partially threaded locking bolt and as depicted in FIG. 13 with a smooth locking bolt. FIGS. 9, 10, 11, 12, 13, and 14 depict embodiments with a pin wall body 3, a centralized smooth bore hole 34 and a smooth locking bolt 33. The two-piece pin wall body comprises: a pin wall body 3 with a pin wall body rim 9 and can have an inside sleeve 31 with a threaded outside wall; and can have a pin wall body outside sleeve 30 with an inside thread. The length of the pin wall body may be adjusted by rotating one of the pin wall sleeves while holding the other sleeve so that the two-piece pin wall body has an adjusted length approximately equal to the thickness of a panel at the location of the panel hole. As a two-piece pin wall body is increased in length to compensate for use in a thicker panel having a deeper hole, a space is created between the pin wall body rim 9 with the pin wall body inside sleeve 31 and the in wall body outside sleeve 30. One or more hollow spacer pin wall body washers 28 may be slipped onto the pin wall body inside sleeve 31 to fill the space created between the pin wall body rim 9 and the pin wall body outside sleeve 30. The pin wall body washer(s) 28 can help to maintain the space between the pin wall body sleeves as the sleeves are tightened together.

For some fastener embodiment uses, the lengths for the pin wall body 3 and the cutter bar tube 1 may be selected to match the panel thickness at the panel hole. As depicted for example in FIG. 7, an alternative design for some fastener embodiments is the option of using an adjustable-length two-piece cutter bar with an adjustable-length two-piece pin wall body. An adjustable length hollow tube cutter bar and an adjustable length pin wall body can be adjusted to approach the thickness of a panel at the panel hole for insertion of the cutter bar and the pin wall body. After the locking arms hinged to the pin wall body have been inserted into the hollow tube of the cutter bar which has been seated into the panel hole, the hinging portion of the pin wall body needs to be able to freely pivot laterally in the hollow space beneath the panel from the pivot pins of the pin wall body so that ends of locking arms can be pivoted when needed to come into contact against inside surfaces of the panel. The maximum length of a locking arm must be less the depth of the hollow space beneath a panel. In standard "2×4" inch stud construction framing for a drywall panel, the hollow space beneath the panel is about 3¼ inches deep that is about the length of a kiln-dried 2×4 inch stud. Thus the locking arms might be as long as about 3 inches. In some embodiments, the length of the locking arms may be shorter, for example, 1, 1¼, 2, 2¼, or 3, inches long. If the hollow space is deeper as in the case of ceiling joists, then longer locking arms can be used in some embodiments.

As depicted in FIG. 4 for example, each locking arm 2 is attached to the pin wall body 3 of the fastener by a pivot pin 6. It is contemplated that various mechanical means may be used to pivot a locking arm from the pin wall body without departing from the contemplated scope of the embodiments of the present invention. A pivot pin hinge is depicted in FIGS. 1, 2, 3, 4, 5, 7, and 8. The pivot angle of a locking arm is defined to be zero (0) degrees when a locking arm is parallel to the axis of the pin wall body hole. When a locking bolt pushes on shoulders of the locking arms, the pivot angle can increase from a value of zero (0) degrees to a value set by the extent that the locking arms ends can pivot in the hollow space beneath a panel. As the example embodiments of the invention depict in FIGS. 2, 3, and 7, the maximum pivot angle of each locking arm ranges between about 85 degrees to about 95 degrees with respect to the reference position of the axis of the locking bolt 4 in the pin wall body being defined as a zero (0) degree pivot angle.

New wall and ceiling construction tend to have flat panel surfaces and embodiments of the present invention can achieve maximum locking arm pivot angles between about 85 degrees to about 95 degrees for anchoring the pin wall body to the inside surface of a panel. Old wall and ceiling construction may deviate in flatness. Obstructions in the hollow space beneath the panel caused by structural framing members, plumbing, wiring, outlets, ductwork, insulation, nail spikes, leftover construction materials, and other irregularities in the hollow space may limit the maximum pivot angle of the locking arms. The pin wall body may need rotation in the hole so that the locking arms can avoid obstructions to locking arm pivoting in the hollow space or locking arms may need to be shorter.

The maximum pivot angle at a panel hole location may be measured and used to design a custom embodiments of the present invention which are modified in terms of the (a) the locking bolt thickness, shaft shape and taper and tip; (b) the locking arm shape or length; or (c) the shoulder angles and shapes. Another option is to use a worm gear drive arrangement for pivoting locking arms over a suitable range of pivot angles in the hollow space beneath the panel. It is contemplated for some embodiments of the present invention that a tool or manually rotated threaded locking bolt may be used as a screw ("worm") to slowly rotate a rounded and toothed shoulder (the "worm gear") of a locking arm hinged by the pivot pin to the pin wall body. Reversal of the manual rotation of the threaded locking bolt can reverse the pivoting of the locking arms in the hollow space. No movement of the locking arm up or down the hole in the pin wall body is permitted by design. A separate bolt attachment for attaching an item or a lower bracket to the pin wall body rim would is used.

In another embodiment, a shaft of a locking bolt may have a plurality of notches and bumps for a quick ratcheting the locking bolt forward in the pin wall body hole as the locking bolt is pushed into the pin wall body to press upon the shoulders of the locking arms, to pivot the locking arms in the hollow space to position against the inside surface of the panel, and to anchor the pin wall body to the inside surface of the panel. For a quick release of the fastener from the panel, a rotation of locking arm releases the locking bolt from its ratcheted position. This may be particularly useful in attaching and detaching items quickly from a panel having a hollow space.

Figure 5:
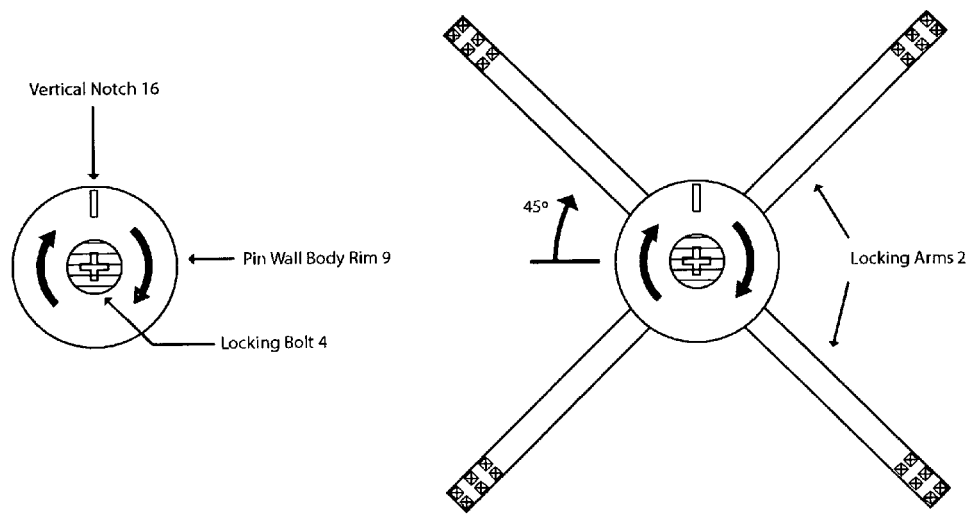
FIG. 5 on left side, depicts the pin wall body rim and locking bolt head after the fastener has been inserted into the drywall panel and FIG. 5 on right side, depicts a fattener with four locking arms fully spread as the locking arms would be against the inside of a drywall panel, in accordance with one embodiment of the present invention.

Optionally, the rotational position of the pin wall body (see depiction in FIG. 5) may be changed to allow locking arms to avoid resistance from a structural framing member or another object in the hollow space beneath the panel. As depicted in FIG. 5, a vertical notch 16 in the pin wall body rim 9 is a reference point for the rotational position of the locking arms 2.

One, two, three, four, five, six, seven, eight, nine, ten or more locking arms may be hinged to a pin wall body. Four locking arms hinged to the pin wall body is a preferred embodiment. The shape of the locking arms is not critical. Locking arms may be round rods, polygonal, beam-shaped or wedge shaped. The locking arms may taper. The distal end of each locking arm can have a spike or teeth to grip or bite into the inside surface of the panel. As mentioned, the panel may for example be located on a wall, a ceiling or a door. Each locking arms may have one, two, three, four, five, six, seven, eight or more locking arm teeth for spiking into the inside surface of the panel as a means for anchoring the pin wall body to an inside surface of the panel more securely.

Figure 6:
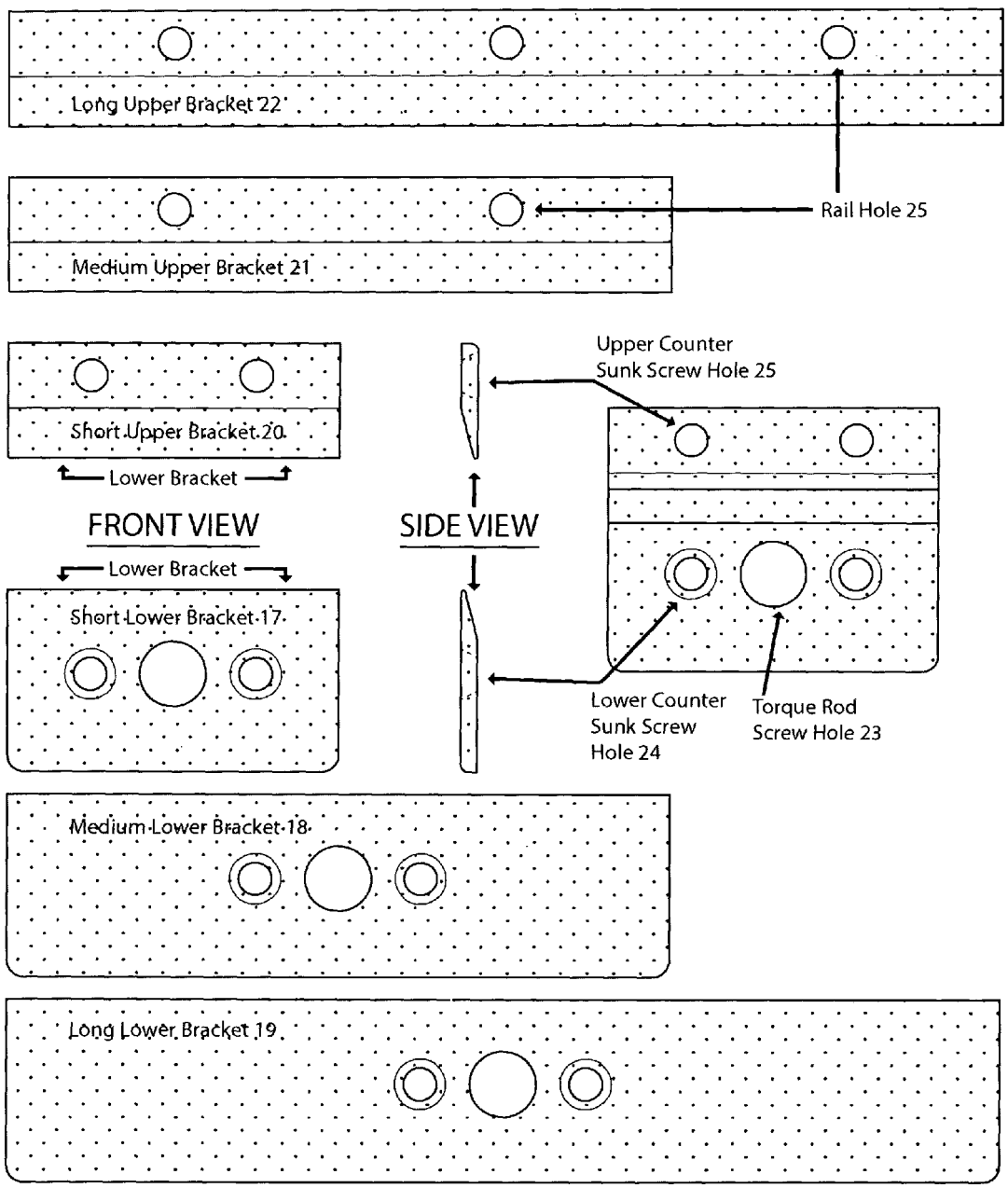
FIG. 6 depicts a front view of short, medium, and long sets of upper and lower brackets with a beveled edge for use with the fastener; and depicted in side view, the beveled lower edge of the upper bracket would wedge into the upper beveled edge of the lower bracket for a quick attachment on a vertical wall panel, as depicted immediately to the right of side view depiction, in accordance with one embodiment of the present invention.

Optionally, in some fastener embodiments of the present invention, a wall panel fastener may further comprises a pair of brackets as a thin rail system as depicted in FIG. 6. The thin rail system comprises: a lower bracket and an upper bracket for efficient and secure attachments of a moderate to heavy weight item. Heavy items needing attachment to a wall panel include cabinetry, mirrors, paintings, shelving, electronics, and similar applications or items needing attachment security. A method for using the thin rail system for efficient and secure attachment of a heavy item, comprises: securely attaching the upper bracket to the item to be attached to the wall panel; securely attaching the lower bracket to a wall panel fastener attached to a wall; and connecting the upper bracket to the lower bracket as a means for efficiently and safely attaching the item to the wall panel. Optionally a light item may be attached to a wall using the bracket system.

As depicted in FIG. 6, for example a short lower bracket 17, a medium lower bracket 18, or a long lower bracket 19 may be used. The fastener is already attached to a wall panel when the lower bracket is then attached to the fastener. The lower bracket then has an upward-directed protruding edge. The shaft of locking bolt 4 is passed through large central hole 23 of the lower bracket and tightened down in the threaded pin wall body hole 11 of the fastener. Optionally, the lower bracket is separately bolted to the fastener using a separate bolt to anchor the lower bracket to the pin wall body by using the lower bracket counter-sunk holes 24 to one or more threaded hole(s) on the pin wall body rim 9 other than the pin wall body hole 11. It is contemplated that lengths for the lower bracket would include lengths in the range from between about one inch to several feet long. A lower bracket may be attached to two wall panel fasteners of the present invention at the same time to increase the horizontal stability of the lower bracket. Another option is to use a thinner pin wall body rim 9 instead of the standard thickness pin wall body rim so that the lower bracket is situated closer to the surface of the wall panel.

As depicted in FIG. 6, a short upper bracket 20, a medium upper bracket 21, or a long upper bracket 22 may be used. The upper bracket is attached to a moderate to heavy the item by screws or bolts using the counter-sunk rail holes 25 in the upper bracket. The upper bracket when attached to the item has a downward-directed protruding edge. The upper and lower brackets are connected by first bringing the item attached to the upper bracket above and then into the proximity of the lower bracket and by then lowering the downward directed edge of the upper bracket into the groove created upward-directed edge of the lower bracket. Alternatively, the upper and lower brackets may be coupled by any other known manner. The upper bracket may be moved horizontally on the lower bracket as needed, for example, for centering the item on the upper bracket as desired. Optionally more than one fastener may be used to secure the lower bracket to a wall panel. This horizontal movement of the upper bracket on the lower bracket may be facilitated using a friction-reducing system such as ball bearings, needle pin bearings, or any other bearings system that can be positioned between the brackets. The horizontal position of the item can be then fixed by, for example, tightening a setscrew between the brackets.

In some embodiments of the invention, the threaded locking bolt shaft is rotated in the threaded hole of the pin wall body to advance the beveled tip of the locking bolt close to the shoulder of the locking arms and then to push upon the shoulders of the locking arms hinged to the pin wall body so that the shoulders are deflected and pivot the locking arms by a maximum pivot angle. For some embodiments, the maximum pivot angle of the locking arms is selected from the group consisting of 30 to 45 degrees, 45 degrees to 70 degrees, 70 degrees to 80 degrees, 80 degrees to 90 degrees, 90 degrees to 100 degrees, 100 degrees to 110 degrees, 110 degrees to 120 degrees, 85 degrees to 95 degrees, and 90 degrees to 95 degrees. Preferably the maximum pivot angle of the locking arms is not attained for some embodiments of the present invention until the locking arms exert a small but acceptable relatively constant positive mechanical force against the inside surface of the panel without perceptibly deforming the panel shape. The small but acceptable relatively constant positive mechanical force by the locking arms against the inside surface of the panel can compensate for changes in ambient temperature and humidity, or other changes that may loosen the anchoring of the pin wall body of the fastener to the inside surface of the panel.

In some embodiments, once the maximum pivot angle for the locking arms occurs, a further rotation of the threaded locking bolt in the threaded hole of the pin wall body does not necessarily change stresses in the fastener or between the fastener and the panel. The selected remaining threaded length of the locking bolt may ultimately be tightened down on the rim of the pin wall body or left untightened so that the shaft can be used for attaching an item.

When caused to fully pivot by a locking bolt, locking arms of the fastener pivot in the hollow space to a maximum pivot angle and locking arm ends exert a small but acceptable, relatively-constant positive mechanical force against the inside surface of the panel without perceptibly deforming the panel shape. As depicted in FIG. 8, a fastener with a cutter bar has a fully inserted locking bolt that has the shoulders of the locking arms maximally separated to slightly more than 90 degrees relative to the defined zero (0) degrees pivot angle of the axis of the hole in the pin wall body. When the locking bolt 4 is rotated so that the tip of the locking bolt does not at all press upon the shoulders of the locking bolt, then the wedge created by the locking bar is eliminated between the shoulders of the locking arms and the locking arms are free to recoil from the prior maximally pivoted angle to a smaller pivot angle.

Pulling on the pin wall body by pulling on the locking bolt imposes a torque at pivot pins 6 to rotate the locking arm fulcrum 32. The lever or moment arm in this case is the length of the locking arms between pivot pin 6 and the locking arm pivot fulcrum 32 during the pulling of the pin wall body by locking bolt 4. Locking arms rotate (i.e., pivot) on the bevel edge of the cutter bar. Accordingly, depicted in FIG. 8, is a locking arm pivot fulcrum 32 at a bevel edge of the cutter bar.

It is easier to retract the pin wall body of the fastener in FIG. 8 than to retract the pin wall body of fastener of FIG. 3 because the moment arm is about twice as long in FIG. 8 than in FIG. 3. Accordingly the fastener embodiment of FIG. 8 is more readily retracted than the fastener embodiment of FIG. 3 and a complete retraction of the pin wall body can occur when the pivot angle of the locking arms approaches a zero (0) pivot angle.

The pin wall body and pin wall body rim have a common threaded hole that runs through the center axis of the pin wall body and pin wall body rim. The locking bolt may be threaded like a machine screw so that the locking bolt can be rotated in the threaded hole of the pin wall. The head of the locking bolt may be square or hexagonal for rotating with a wrench or socket wrench or any other rotatable shape for use with a rotating tool. Alternatively, the head of the locking bolt may have a screw head that is grooved to be rotated using a standard screwdriver or a Philips screw driver or by another means. Alternatively, the head of the locking bolt may have a hexagonal or square hole that can be rotated using a hexagonal key rod or square key rod. The thickness of a panel may not be constant. The thickness of the panel at the location of the hole in the panel should be known in order to use a pin wall body and optionally a cutter bar of a length approximately equal to the panel thickness.

Optionally, a portion of the locking bolt on the tip side of the locking bolt may be smooth and not been threaded. The locking bolt shaft may be tapered where the shaft is not threaded. In one embodiment about one half of the locking bolt shaft is threaded and about one half of the bolt shaft is not threaded.

In some embodiments of the invention, a percentage of the length from the tip to the head of the locking bolt shaft is threaded and the percentage of the length from the tip to the head of the locking bolt shaft that is threaded may be selected from the group consisting of zero (0) percent, about zero (0) to about 10 percent, about 10 percent to about 20 percent, about 20 percent to about 30 percent, about 30 percent to about 40 percent, about 40 percent to about 50 percent, about 50 percent to about 60 percent, about 60 percent to about 70 percent, about 70 percent to about 80 percent, about 80 percent to about 90 percent, about 90 percent to about 100 percent, and about 100 percent. The portion of the locking bolt that is not threaded has a smaller diameter than the outer threaded diameter of the locking bolt. Being smaller, the not threaded portion of the locking bolt shaft can slide when pushed through the threaded hole in a pin wall body meant for threading onto the threaded portion of the locking bolt shaft. For example, in one embodiment of the invention, about fifty (50) percent of the locking bolt shaft is threaded and about fifty (50) percent of the locking bolt shaft is not threaded with the not threaded shaft portion of a reduced diameter to allow the not threaded portion to be capable of being slid through the threaded hole in the pin wall body. A partially threaded locking bolt shaft having a portion with a reduced diameter smooth shaft is useful in a quick method for anchoring the fastener to a hole in the panel, which comprises: pushing a smooth shaft of the locking bolt through a threaded hole in the pin wall body for delivering a tip of the locking bolt to shoulders of the locking arms hinged to the pin wall body for pivoting the locking arms in the hollow space to a position against an inside surface of the panel; further pushing the smooth shaft of locking bolt past the spread apart shoulder functions for locking the locking arms in the position against the inside surface of the panel; and rotating a threaded section of the locking bolt shaft in a threaded section of the pin wall body for keeping the locking bolt between the shoulders of the locking arms.

Optionally the tip of the locking bolt may be beveled or rounded. As a threaded locking bolt is rotated in the threaded hole of the pin wall body, the tip of the locking bolt can move in the pin wall body towards the shoulders of the locking arms hinged to the pin wall body. Various lengths for the locking bolt may be used depending upon the fastener design and the item to be attached from the locking bolt. Preferably, the locking bolt is long enough that the head of the locking bolt extends at least ½ inch out from the rim of the pin wall body when the remainder of the locking bolt has passed through the pin wall body rim, the pin wall body rim, and a portion of the locking bolt shaft has extended beyond the fully pushed upon and fully locked apart shoulders of the locking arms. It is contemplated that one or more threaded locking bolts may be used in one or more threaded holes positioned in various orientations and at various angles relative to the axis of the pin wall body as a means for: (a) pushing upon shoulders of locking arms; for (a) locking the fully pivoted locking arms against the inside surface of the panel; or (b) for increasing the number of attachments that an item can make with the pin wall body rim.

After inserting the locking arms hinged to the pin wall body and the pin wall body into a hole in the panel, the shoulders of the pivotable locking arms can be pushed upon and locked apart by the advancement of the locking bolt tip when the threaded locking bolt is rotated in the threaded hole in the center of the pin wall body by rotating the head of the locking bolt. The locking bolt may be rotated in a clockwise direction to move the tip of the locking bolt towards the shoulders of the locking arms to push upon and lock apart the shoulders of the locking arms.

A method of attaching some embodiments of the fastener of the present invention to a panel with a hollow space, comprises: creating a hole in the panel; inserting a portion of a pin wall body and a locking arm into the hole in the panel and into the hollow air space beneath the panel; rotating a threaded locking bolt in a threaded hole of the pin wall body to advance the locking bolt to force a shoulder of the locking arm to move; moving the shoulder of the locking arm to pivot the locking arm with respect to the pin wall body using a pivot pin; and pivoting the locking arm in the hollow air space until a distal end of the locking arm contacts the interior surface of the panel to attach the fastener to the panel. The method of attaching some embodiments of the fastener of the present invention to a panel with a hollow space may further comprise using the head of the locking bolt for attaching the item to the fastener before the fastener has been attached to the panel or after the fastener has been attached to the panel.

One embodiment of the invention is a fastener for attaching an item to a panel over a hollow space once the panel has a hole for securing the fastener to the panel, the fastener comprising: a threaded locking bolt having a locking bolt head, a threaded locking bolt shaft and a locking bolt tip; a pin wall body with a pin wall body rim; and locking arms with shoulders hinged to the pin wall body, wherein the locking arms with the shoulders hinged to the pin wall body are capable of being inserted into a panel hole, wherein the pin wall body has a threaded hole for rotating the threaded locking bolt to move the locking bolt tip to push upon and lock apart the shoulders of the locking arms hinged to the pin wall body as a means for causing the locking arms to pivot into a locked position in the hollow space next to an inside surface of the panel as a means for anchoring the pin wall body to an inside surface of the panel, wherein the pin wall body rim is capable of anchoring the pin wall body to an outside surface of the panel, and wherein the locking bolt head of the threaded locking bolt in the threaded hole of the pin wall body rim is capable of being used as a means for attaching an item to the pin wall body rim when the pin wall body has been anchored to the inside surface and outside surface of the panel over a hollow space in the panel.

A second embodiment of the invention is a fastener for attaching an item to a panel over a hollow space once the panel has a hole for securing the fastener to the panel, the fastener comprising: a threaded locking bolt having a locking bolt head, a threaded locking bolt shaft and a locking bolt tip; a pin wall body with a pin wall body rim; and locking arms with shoulders hinged to the pin wall body, wherein the locking arms with the shoulders hinged to the pin wall body are capable of being inserted into a panel hole, wherein the pin wall body has a threaded hole for rotating the threaded locking bolt to move the locking bolt tip to push upon and lock apart the shoulders of the locking arms hinged to the pin wall body as a means for causing the locking arms to pivot into a locked position in the hollow space next to an inside surface of the panel as a means for anchoring the pin wall body to an inside surface of the panel, wherein the pin wall body rim is capable of anchoring the pin wall body to an outside surface of the panel, wherein the locking bolt head of the threaded locking bolt in the threaded hole of the pin wall body rim is capable of being used as a means for attaching an item to the pin wall body rim when the pin wall body has been anchored to the inside surface and outside surface of the panel over a hollow space in the panel, and wherein the fastener further comprises a cutter bar capable of cutting the hole in the panel. Each locking arm is attached to the pin wall body by a pivoting means, for example, by using a pivot pin that is secured in the pin wall body.

A fastener for a panel having a hole and a hollow space beneath the hole for an attachment of the fastener to the panel, the fastener comprising: a locking bolt having a tip and a rigid shaft; locking arms having shoulders which can be pushed by the small tip of the locking bolt so that the shoulders undergo a rotation and free ends of the locking arms swing, and the locking arms having shoulders which can be held apart by the rigid shaft of the locking bolt so that the free ends of the locking arms remain in a fully apart position; pivot pins for supporting the shoulders during the rotation of the shoulders and when the shoulders are held apart by the rigid shaft of the locking bolt; and a pin wall body for holding the pivot pins, the pin wall body having a longitudinal hole for guiding the shaft of the locking bolt to the shoulders of the locking arms, the pin wall body having a rim which is situated above the panel when the pin wall body is situated in the hole of the panel.

The fastener can have a percentage of the rigid shaft of the locking bolt as a threaded section, the percentage selected from the group consisting of zero percent to about 10 percent, about 10 percent to about 20 percent, about 20 percent to about 30 percent, about 30 percent to about 40 percent, about 40 percent to about 50 percent, about 50 percent to about 60 percent, about 60 percent to about 70 percent, about 70 percent to about 80 percent, about 80 percent to about 90 percent, and about 90 percent to 100 percent.

The fastener can have a percentage of the longitudinal hole in the pin wall body as a threaded section in which can be rotated the threaded section of the rigid shaft of the locking bolt, the percentage selected from the group consisting of about zero percent to about 10 percent, about 10 percent to about 20 percent, about 20 percent to about 30 percent, about 30 percent to about 40 percent, about 40 percent to about 50 percent, about 50 percent to about 60 percent, about 60 percent to about 70 percent, about 70 percent to about 80 percent, about 80 percent to about 90 percent, and about 90 percent to about 100 percent.

The fastener can have the locking arms having one or more locking arm teeth.

The fastener can have a the number of locking arms. The number of locking arms can be is selected from the group consisting of two locking arms, three locking arms, four locking arms, five locking arms, six locking arms, seven locking arms, eight locking arms, nine locking arms, and ten locking arms.

The fastener can have a locking bolt tip is selected from the group consisting of a pointed tip, a rounded tip, a beveled tip, a concave bevel tip, a curved tip, an angular tip, a high friction surfaced tip, a threaded tip, a worm gear tip, wherein the shoulders of the locking arms which can be contacted during an attachment of the fastener to a panel, are shoulders having a surface is selected from the group consisting of a smooth contact surface, a geared contact surface which can be moved by a gear of the locking bolt, and a surface with an fine abrasive coating.

The fastener can a pin wall body with a cross-sectional shape selected from the group consisting of a round cross-sectional shape, a square cross-sectional shape, a rectangular cross-sectional shape, a hexagonal cross-sectional shape, a polygonal cross-sectional shape, and a combination thereof.

The fastener can have a round cross-sectional shape pin wall body, which comprises: at least two parts with each part having a threaded sleeve for threading the parts together so that the pin wall body has an adjustable longitudinal length for fitting the pin wall body of the fastener into a panel hole of a specific thickness panel.

The fastener can also comprises a hollow cutter bar providing structural support surrounding the pin wall body of the fastener when the fastener is situated in the hole of the panel, wherein the hollow cutter bar has a cross-sectional shape selected from the group consisting of a round shape, a square shape, a rectangular shape, a hexagonal shape, a polygonal shape, and a combination shape thereof.

The fastener can have a round cross-sectional shape hollow cutter bar which comprises: at least two parts with each part having a threaded sleeve for threading the parts together so that the hollow cutter bar has an adjustable longitudinal length for fitting the hollow cutter bar of the fastener into a panel hole of a specific thickness panel.

The fastener can further comprise one of more brackets for attaching to the pin wall body, wherein one or more of the brackets provides a site of attachment for the item.

The fastener may make connection between two or more of the brackets, each bracket having one or more beveled edges for making the connection between two or more brackets.

The fastener have brackets wherein a first bracket is attached to the pin wall body, a second bracket is attached to the item, the first bracket having an attachment to the second bracket allowing the second bracket to move horizontally on the first bracket so as to allow a horizontal position adjustment of the item attached to the fastener attached to the panel.

A method for securing an item to a fastener attached to a panel over a hollow space, the method may comprise the steps of: (a) cutting the panel to have a hole; (b) inserting locking arms hinged to a pin wall body into the hole of the panel, wherein each locking arm is connected to the pin wall body by a pivot pin, wherein the pin wall body has a longitudinal hole, and wherein the pin wall body has a rim for holding the pin wall body from falling into the hollow space below the hole of the panel; (c) keeping the rim of the pin wall body against an outside edge of the hole of the panel; (d) advancing the rigid shaft of a locking bolt in the longitudinal hole of the pin wall body; (e) advancing the tip of the locking bolt for contacting shoulders of the locking arms to cause rotating of the shoulders of the locking arms and pivoting of free ends of the locking arms in the hollow space beneath the panel; (f) advancing the tip of the locking bolt past shoulders of the locking arms to cause the free ends of the locking arms to remain adjacent to inside surfaces of the panel; and (g) securing the item to a site on the fastener which will be located on an outer side of the panel after the fastener is attached to the panel. The method of using the fastener may further comprise inserting a hollow cutter bar in the hole of the panel prior to inserting the locking arms hinged to the pin wall body into the hole of the panel.

The method of using the fastener may include wherein the pin wall body has an outer diameter which is between about 1.1 times wider to about 10 times wider than the distance between the pivot pins attached to the shoulders of opposing locking arms of the fastener.

The method of using the fastener may include a step of: making an adjustment to the longitudinal length of the pin wall body to compensate for the thickness of the panel adjacent to the hole in the panel prior to the step of keeping the rim of the pin wall body situated against an outside edge of the hole, the adjustment made by using a round cross-sectional shape pin wall body which comprises: at least two parts with each part having a threaded sleeve for threading the parts together so that the pin wall body has an adjustable longitudinal length.

A method for securing a fastener to a panel over a hollow space, the fastener having a locking bolt with a threaded section and a pin wall body having a longitudinal hole with a threaded section, the method may comprise the steps of: (a) cutting the panel to have a hole; (b) inserting locking arms hinged to a pin wall body into the hole of the panel, wherein each locking arm is connected to the pin wall body by a pivot pin, wherein the pin wall body has a longitudinal hole having a threaded section, and wherein the pin wall body has a rim for restraining the pin wall body from falling into the hollow space of the panel; (c) keeping the rim of the pin wall body against an outside edge of the hole; (d) advancing the rigid shaft of the locking bolt in the longitudinal hole of the pin wall body; (e) rotating the locking bolt when the threaded section of the rigid shaft of the locking bolt encounters the threaded section of the longitudinal hole of the pin wall body so as to advance the rigid shaft of the locking bolt into the threaded section of the longitudinal hole in the pin wall body; (o) contacting the shoulders of the locking arms with the advancing rigid shaft of the locking bolt for causing a rotation of the shoulders of the locking arms and pivoting free ends of the locking arms in the hollow space beneath the panel; (f) advancing the tip of the locking bolt past shoulders of the locking arms to cause the free ends of the locking arms to remain adjacent to inside surfaces of the panel; and (g) securing the item to a site on the fastener which will be located on an outer side of the panel after the fastener is attached to the panel. The method of using the fastener may further include a step of: inserting a hollow cutter bar in the hole of the panel prior to inserting the locking arms hinged to the pin wall body into the hole of the panel.

The method of using the fastener may include wherein the pin wall body has a diameter which is between about 1.1 times wider to about 10 times wider than the distance between pivot pins attached to the shoulders of opposing locking arms.

The method of using the fastener may further comprises the step of: making an adjustment to the longitudinal length of the pin wall body to compensate for the thickness of the panel adjacent to the hole in the panel prior to the step of keeping the rim of the pin wall body situated against an outside edge of the hole, the adjustment made by using a round cross-sectional shape pin wall body which comprises: at least two parts with each part having a threaded sleeve for threading the parts together so that the pin wall body has an adjustable longitudinal length.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods.

Unless defined otherwise, all technical and scientific terms used herein have the same meaning as commonly understood by one of ordinary skill in the art to which this invention belongs. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A fastener for attaching an item to a panel having a hollow space beneath the panel for an attachment of the fastener, the fastener comprising:
   a round hollow tube cutter bar, further comprising a round hollow tube outside sleeve and a round hollow tube inside sleeve,
      wherein the round hollow tube outside sleeve has a threaded inside wall,
      wherein the round hollow tube inside sleeve has an outside thread,
      wherein the inside threaded wall of the round hollow tube outside sleeve is threaded onto the outside thread of the round hollow tube bar inside sleeve,
      wherein the round hollow tube outside sleeve is for rotating with respect to the round hollow tube inside sleeve as a means for adjusting a longitudinal length of the round hollow tube cutter bar to match a panel thickness,
      wherein the round hollow tube cutter bar has a beveled front end with cutter bar teeth for cutting the panel to have a panel hole,
      wherein the round hollow tube cutter bar has a backside cutter bar rim, and
      wherein the round hollow tube cutter bar is for leaving in a fully-inserted position in the panel hole with the backside cutter bar rim set down on the outside surface of the panel to add a structural support to the panel hole;
   a pin wall body with a pin wall body rim and having a centralized pin wall body hole with a threaded hole section;
   a locking bolt with a locking bolt head, a locking bolt tip, and having a locking bolt shaft with a threaded shaft section,
      wherein the locking bolt tip and the locking bolt shaft of the locking bolt are for inserting in the centralized pin wall body hole with the threaded shaft section of the locking bolt shaft for rotating in the threaded hole section of the centralized pin wall body hole;
   one or more locking arms, wherein each locking arm has a shoulder hinged to the pin wall body, and
wherein the shoulder has a smooth contact surface; and
a pivot pin for each shoulder,
   wherein the pivot pin is for connecting the shoulder of the locking arm to the pin wall body so that the shoulder of the locking arm is hinged to the pin wall body,
   wherein the locking arm with the shoulder hinged to the pin wall body is for inserting into the cutter bar hole of the hollow tube cutter bar in a fully-inserted position in the panel hole so that the rim of the pin wall body rests against the cutter bar rim with the hollow tube cutter bar for surrounding the pin wall body inserted in the cutter bar hole to provide structural support for the pin wall body,
   wherein the pin wall body has a round cross-sectional shape for inserting into the cutter bar hole so that the hollow tube cutter bar can function as a structural bushing element between the panel hole and the pin wall body,
   wherein the locking bolt tip and the locking bolt shaft of the locking bolt are for inserting into the centralized pin wall body hole of the pin wall body with the threaded shaft section of the locking bolt shaft for rotating in the threaded hole section of the centralized pin wall body hole so that the locking bolt tip and the locking bolt shaft can be advanced through the centralized pin wall body hole of the pin wall body to contact the shoulder of the locking arm hinged to the pin wall body,
   wherein the locking bolt tip and the locking bolt shaft of the locking bolt are for pushing the shoulder of the locking arm hinged to the pin wall body so that the shoulder of the locking arm hinged to the pin wall body can undergo a rotation and the locking arm can swing laterally in the hollow space beneath the panel to a position against an inside surface of the panel,
   wherein the pivot pin is for supporting the shoulder of the locking arm when the shoulder of the locking arm undergoes the rotation and the locking arm swings laterally in the hollow space beneath the panel to the position against the inside surface of the panel,
   wherein the threaded shaft section of the locking bolt shaft is for rotating in the threaded hole section of the centralized pin wall body hole so that a portion of the locking bolt shaft pushes past the shoulder of the locking arm hinged to the pin wall body to cause the locking arm to remain in a locked position against the inside surface of the panel for anchoring the pin wall body to the inside surface of the panel,
   wherein the pivot pin is for supporting the shoulder of the locking arm when the locking bolt shaft pushes past the shoulder of the locking arm to cause the locking arm to remain in the locked position against the inside surface of the panel for anchoring the pin wall body to the inside surface of the panel, and
   wherein the fastener can be removed intact, reusable, and not deformed.

2. The fastener according to claim 1, further comprising one or more cutter bar washers for inserting onto the round hollow tube inside sleeve for occupying a space arising between the round hollow tube inside sleeve rim and an edge of the round hollow tube outside sleeve when the longitudinal length of the round hollow tube cutter bar is increased to match a panel thickness.

3. The fastener according to claim 1, wherein the locking arm has one or more locking arm teeth.

4. The fastener according to claim 1, wherein the locking bolt tip is a beveled tip.

5. The fastener according to claim 1, wherein the number of locking arms is selected from the group consisting of two locking arms, three locking arms, four locking arms, five locking arms, six locking arms, seven locking arms, eight locking arms, nine locking arms, and ten locking arms.

6. The fastener according to claim 5, wherein the pin wall body has an outer diameter which is between about 1.1 times wider to about 10 times wider than the distance between the pivot pins attached to the shoulders of opposing locking arms of the fastener.

7. The fastener according to claim 1, wherein the round pin wall body with the pin wall body rim and the centralized pin wall body hole with the threaded hole section has a round outside sleeve and a round inside sleeve,
   wherein the round outside sleeve has an inside thread,
   wherein the round inside sleeve with an outside thread,
   wherein the inside thread of the round outside sleeve is threaded onto the outside thread of the round inside sleeve, and
   wherein the round outside sleeve is for rotating with respect to the round inside sleeve as a means for adjusting a longitudinal length of the round pin wall body to match a panel thickness.

8. The fastener according to claim 7, further comprising one or more hollow spacer pin wall body washers for slipping onto the pin wall body inside sleeve to fill a space created between the pin wall body rim and the pin wall body outside sleeve when the adjustable length pin wall body is increased in length to compensate for a thicker panel.

9. The fastener according to claim 1, further comprising: a bracket which has a hole for passing the locking bolt shaft with the threaded shaft section through the hole in the bracket and into the pin wall body hole for anchoring the bracket to the panel before rotating the locking bolt to tighten the locking bolt head against the bracket, wherein the bracket is connected to the item by a connecting means.

10. The fastener according to claim 1, further comprising: a separate connecting means for attaching the bracket to the pin wall body rim so that the locking bolt is not involved in attaching the bracket to the pin wall body and the pin wall body can be anchored to the wall panel prior to attaching the bracket to the pin wall body rim.

11. The fastener according to claim 1, further comprising a lower bracket and an upper bracket, wherein the lower bracket is for anchoring to the pin wall body using the locking bolt or another anchoring means, so that the lower bracket anchored to the pin wall body has an upward-directed protruding edge,
   wherein the upper bracket is attached to the item so that the second bracket has a downward-directed protruding edge,
   wherein the upper bracket is for connecting to the lower bracket by lowering the downward-directed edge of the upper bracket into the upward-directed edge of the lower bracket, and
   wherein the item attached on the upper bracket can be moved horizontally for adjusting a horizontal position of the item.

12. A fastener for attaching an item to a panel having a hollow space beneath the panel for an attachment of the fastener, the fastener comprising:
   a round hollow tube cutter bar comprising a round hollow tube outside sleeve and a round hollow tube inside sleeve, wherein the round hollow tube outside sleeve has a threaded inside wall, wherein the round hollow tube inside sleeve has an outside thread, wherein the threaded inside wall of the round hollow tube outside sleeve is threaded onto the outside thread of the round hollow tube bar inside sleeve, wherein the round hollow tube outside sleeve is for rotating with respect to the round hollow tube inside sleeve as a means for adjusting a longitudinal length of the round hollow tube cutter bar to match a panel thickness, wherein the round hollow tube cutter bar has a beveled front end with cutter bar teeth for cutting the panel to have a panel hole, wherein the round hollow tube cutter bar has a backside cutter bar rim, and wherein the round hollow tube cutter bar is for leaving in a fully-inserted position in the panel hole with the backside cutter bar rim set down on the outside surface of the panel to add a structural support to the panel hole;

a pin wall body with a pin wall body rim and having a centralized pin wall body smooth bore hole;

a smooth locking bolt with a locking bolt head, a locking bolt tip, and a locking bolt shaft, wherein the locking bolt tip and the locking bolt shaft of the smooth locking bolt are for inserting in the centralized pin wall body smooth bore hole;

one or more locking arms, wherein each locking arm has a shoulder hinged to the pin wall body, and wherein the shoulder has a smooth contact surface; and a pivot pin for each shoulder, wherein the pivot pin is for connecting the shoulder of the locking arm to the pin wall body so that the shoulder of the locking arm is hinged to the pin wall body, wherein the locking arm with the shoulder hinged to the pin wall body is for inserting into the cutter bar hole of the hollow tube cutter bar in a fully-inserted position in the panel hole so that the rim of the pin wall body rests against the cutter bar rim with the hollow tube cutter bar for surrounding the pin wall body inserted in the cutter bar hole to provide structural support for the pin wall body, wherein the pin wall body has a round cross-sectional shape for inserting into the cutter bar hole so that the hollow tube cutter bar can function as a structural bushing element between the panel hole and the pin wall body, wherein the locking bolt tip and the locking bolt shaft of the smooth locking bolt are for inserting into the centralized pin wall body smooth bore hole so that the locking bolt tip and the locking bolt shaft can be advanced through the centralized pin wall body smooth bore hole to contact the shoulder of the locking arm hinged to the pin wall body, wherein the locking bolt tip and the locking bolt shaft of the smooth locking bolt are for pushing the shoulder of the locking arm hinged to the pin wall body so that the shoulder of the locking arm hinged to the pin wall body can undergo a rotation and the locking arm can swing laterally in the hollow space beneath the panel to a position against an inside surface of the panel, wherein the pivot pin is for supporting the shoulder of the locking arm when the shoulder of the locking arm undergoes the rotation and the locking arm swings laterally in the hollow space beneath the panel to the position against the inside surface of the panel, wherein the locking bolt shaft of the smooth locking bolt is for pushing past the shoulder of the locking arm hinged to the pin wall body to cause the locking arm to remain in a locked position against the inside surface of the panel for anchoring the pin wall body to the inside surface of the panel, wherein the pivot pin is for supporting the shoulder of the locking arm when the locking bolt shaft of the smooth locking bolt pushes past the shoulder of the locking arm to cause the locking arm to remain in the locked position against the inside surface of the panel for anchoring the pin wall body to the inside surface of the panel, and wherein the fastener can be removed intact, reusable, and not deformed.

13. The fastener according to claim 12, further comprising one or more cutter bar washers for inserting onto the round hollow tube inside sleeve for occupying a space arising between the round hollow tube inside sleeve rim and an edge of the round hollow tube outside sleeve when the longitudinal length of the round hollow tube cutter bar is increased to match a panel thickness.

14. The fastener according to claim 12, wherein the locking bolt tip is a beveled tip.

15. The fastener according to claim 12, wherein the number of locking arms is selected from the group consisting of two locking arms, three locking arms, four locking arms, five locking arms, six locking arms, seven locking arms, eight locking arms, nine locking arms, and ten locking arms.

16. The fastener according to claim 12, wherein the locking arms have one or more locking arm teeth.

17. The fastener according to claim 12, wherein the pin wall body has an outer diameter which is between about 1.1 times wider to about 10 times wider than the distance between the pivot pins attached to the shoulders of opposing locking arms of the fastener.

18. The fastener according to claim 1, wherein the round pin wall body with the pin wall body rim and the centralized pin wall smooth bore hole has a round outside sleeve and a round inside sleeve, wherein the round outside sleeve has an inside thread, wherein the round inside sleeve with a threaded outside wall, wherein the inside thread of the round outside sleeve is threaded onto the threaded outside wall of the round inside sleeve, and wherein the round outside sleeve is for rotating with respect to the round inside sleeve as a means for adjusting a longitudinal length of the round pin wall body to match a panel thickness.

19. The fastener according to claim 18 further comprising one or more hollow spacer pin wall body washers for slipping onto the pin wall body inside sleeve to fill a space created between the pin wall body rim and the pin wall body outside sleeve when the adjustable length pin wall body is increased in length to compensate for a thicker panel.

20. The fastener according to claim 12, further comprising a lower bracket and an upper bracket, wherein the lower bracket is anchored to the pin wall body using an attaching means so that the lower bracket anchored to the pin wall body has an upward-directed protruding edge, wherein the upper bracket is attached to the item so that the upper bracket has a downward-directed protruding edge, wherein the upper bracket is for connecting to the lower bracket by lowering the downward-directed edge of the upper bracket into the upward-directed edge of the lower bracket, and wherein the item attached on the upper bracket can be moved horizontally for adjusting a horizontal position of the item.

* * * * *